US 7,668,125 B2

(12) United States Patent
Kadous

(10) Patent No.: US 7,668,125 B2
(45) Date of Patent: Feb. 23, 2010

(54) INCREMENTAL REDUNDANCY TRANSMISSION FOR MULTIPLE PARALLEL CHANNELS IN A MIMO COMMUNICATION SYSTEM

(75) Inventor: Tamer Kadous, San Diego, CA (US)

(73) Assignee: Qualcomm Incorporated, San Diego, CA (US)

( * ) Notice: Subject to any disclaimer, the term of this patent is extended or adjusted under 35 U.S.C. 154(b) by 1363 days.

(21) Appl. No.: 10/785,292

(22) Filed: Feb. 23, 2004

(65) Prior Publication Data

US 2005/0063378 A1 Mar. 24, 2005

Related U.S. Application Data

(60) Provisional application No. 60/501,776, filed on Sep. 9, 2003, provisional application No. 60/531,393, filed on Dec. 19, 2003.

(51) Int. Cl.
*H04B 7/00* (2006.01)
(52) U.S. Cl. .................. 370/310; 370/389; 370/465; 370/477
(58) Field of Classification Search .............. 370/203, 370/204, 328, 389, 141, 334
See application file for complete search history.

(56) References Cited

U.S. PATENT DOCUMENTS

| 7,379,434 B2 | 5/2008 | Moulsley et al. ............ 370/318 |
| 2003/0128705 A1 | 7/2003 | Yi et al. ...................... 370/394 |
| 2004/0057530 A1 * | 3/2004 | Tarokh et al. ............... 375/267 |
| 2005/0068908 A1 | 3/2005 | Qian et al. ................... 370/278 |
| 2009/0042519 A1 * | 2/2009 | Sudo .......................... 455/101 |

FOREIGN PATENT DOCUMENTS

| EP | 1187386 | 3/2002 |
| WO | 03032564 | 4/2003 |
| WO | 03034611 | 4/2003 |

OTHER PUBLICATIONS

International Search Report—PCT/US04/026491, International Search Authority—European Patent Office—Mar. 28, 2006.

* cited by examiner

*Primary Examiner*—Chi H. Pham
*Assistant Examiner*—Shick Hom
(74) *Attorney, Agent, or Firm*—Sandip S. Minhas; Larry J. Moskowitz

(57) ABSTRACT

For incremental redundancy transmission on multiple parallel channels in a MIMO system, a transmitter processes (e.g., encodes, partitions, interleaves, and modulates) each data packet for each parallel channel based on a rate selected for the parallel channel and obtains multiple symbol blocks for the packet. For each data packet, the transmitter transmits one symbol block at a time on its parallel channel until a receiver recovers the packet or all blocks have been transmitted. The receiver performs detection and obtains symbol blocks transmitted on the parallel channels. The receiver recovers the data packets transmitted on the parallel channels independently or in a designated order. The receiver processes (e.g., demodulates, deinterleaves, re-assembles, and decodes) all symbol blocks obtained for each data packet and provides a decoded packet. The receiver may estimate and cancel interference due to recovered data packets so that data packets recovered later can achieve higher SINRs.

63 Claims, 16 Drawing Sheets

| | 1 | 2 | 3 | 4 | 5 | 6 | 7 | 8 | 9 | 10 | 11 | 12 | 13 | 14 | 15 | 16 |
|---|---|---|---|---|---|---|---|---|---|---|---|---|---|---|---|---|
| Antenna 1 | $s_{1,1}$ | 0 | $s_{2,3}$ | 0 | $s_{1,5}$ | 0 | $s_{2,7}$ | 0 | $s_{1,9}$ | 0 | $s_{2,11}$ | 0 | $s_{1,13}$ | 0 | $s_{2,15}$ | 0 |
| Antenna 2 | 0 | $s_{1,2}$ | 0 | $s_{2,4}$ | 0 | $s_{1,6}$ | 0 | $s_{2,8}$ | 0 | $s_{1,10}$ | 0 | $s_{2,12}$ | 0 | $s_{1,14}$ | 0 | $s_{2,16}$ |
| Antenna 3 | $s_{2,1}$ | 0 | $s_{1,3}$ | 0 | $s_{2,5}$ | 0 | $s_{1,7}$ | 0 | $s_{2,9}$ | 0 | $s_{1,11}$ | 0 | $s_{2,13}$ | 0 | $s_{1,15}$ | 0 |
| Antenna 4 | 0 | $s_{2,2}$ | 0 | $s_{1,4}$ | 0 | $s_{2,6}$ | 0 | $s_{1,8}$ | 0 | $s_{2,10}$ | 0 | $s_{1,12}$ | 0 | $s_{2,14}$ | 0 | $s_{1,16}$ |

Subbands → / Time ↗

*FIG. 4*

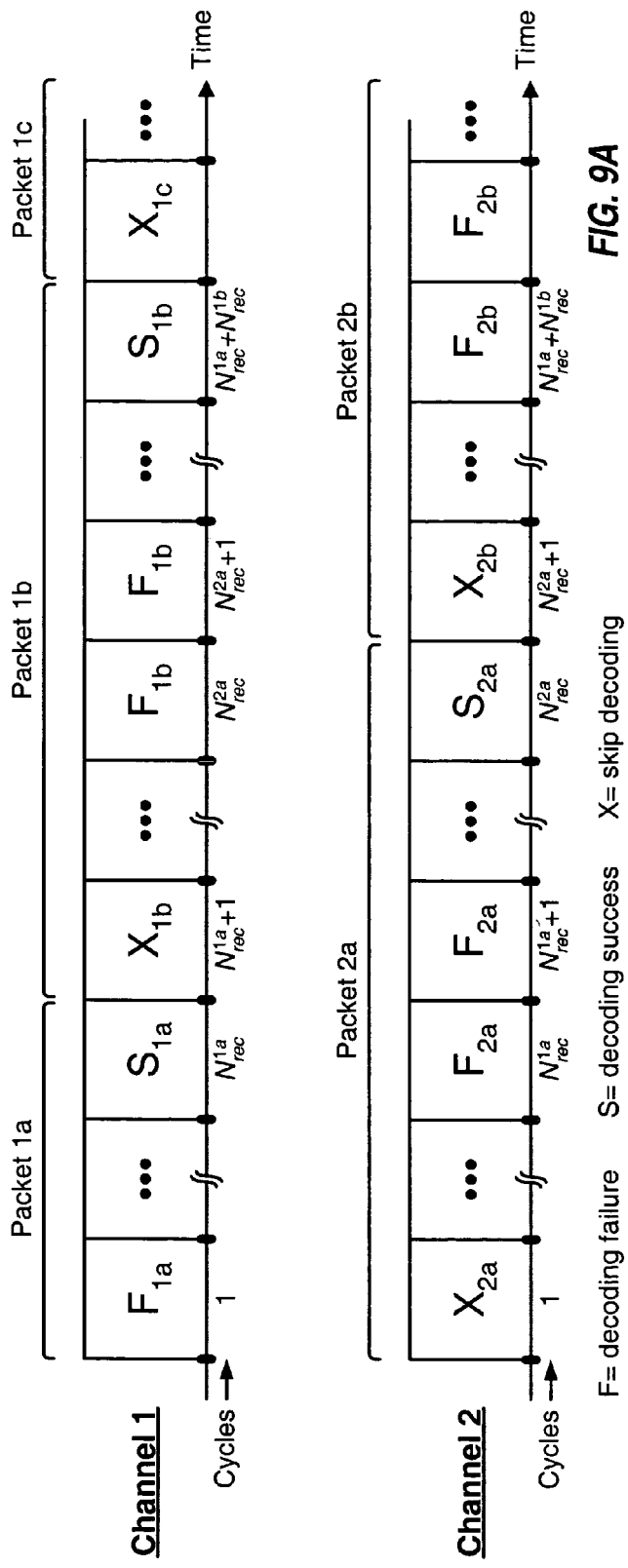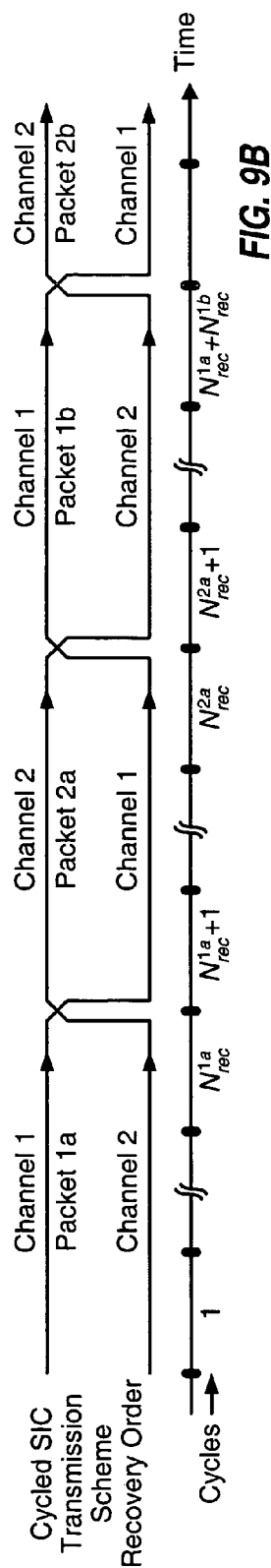

INCREMENTAL REDUNDANCY TRANSMISSION FOR MULTIPLE PARALLEL CHANNELS IN A MIMO COMMUNICATION SYSTEM

This application claims the benefit of provisional U.S. Application Ser. No. 60/501,776, entitled "H-ARQ for MIMO Systems with Successive Interference Cancellation," filed Sep. 9, 2003 and U.S. Application Ser. No. 60/531,393, entitled "Incremental Redundancy Transmission for Multiple Parallel Channels in a MIMO Communication System," filed Dec. 19, 2003 assigned to the assignee of the present application, and incorporated herein by reference in its entirety for all purposes.

BACKGROUND

I. Field

The present invention relates generally to communication, and more specifically to techniques for transmitting data on multiple parallel channels in a multiple-input multiple-output (MIMO) communication system.

II. Background

A MIMO system employs multiple ($N_T$) transmit antennas and multiple ($N_R$) receive antennas for data transmission and is denoted as an ($N_T$, $N_R$) system. A MIMO channel formed by the $N_T$ transmit and $N_R$ receive antennas may be decomposed into $N_S$ spatial channels, where $N_S \leq \min\{N_T, N_R\}$, as described below. Ns data streams may be transmitted on the $N_S$ spatial channels. The MIMO system can provide increased transmission capacity if the $N_S$ spatial channels created by the multiple transmit and receive antennas are used for data transmission.

A major challenge in a MIMO system is selecting suitable rates for data transmission on the MIMO channel based on channel conditions. A "rate" may indicate a particular data rate or information bit rate, a particular coding scheme, a particular modulation scheme, a particular data packet size, and so on. The goal of the rate selection is to maximize the overall throughput on the $N_S$ spatial channels while meeting certain quality objectives, which may be quantified by a target packet error rate (e.g., 1% PER) or some other measures.

The transmission capacity of each spatial channel is dependent on the signal-to-noise-and-interference ratio (SINR) achieved by that spatial channel. The SINRs for the $N_S$ spatial channels are dependent on the channel conditions and may further be dependent on the manner in which the data streams are recovered at the receiver. In one conventional MIMO system, a transmitter encodes, modulates, and transmits each data stream in accordance with a rate selected based on a model of a static MIMO channel. Good performance can be achieved if the model is accurate and if the MIMO channel is relatively static (i.e., does not change much over time). In another conventional MIMO system, a receiver estimates the MIMO channel, selects a suitable rate for each spatial channel based on the channel estimates, and sends Ns selected rates for the Ns spatial channels to the transmitter. The transmitter then processes Ns data streams in accordance with the selected rates and transmits these streams on the Ns spatial channels. The performance of this system is dependent on the nature of the MIMO channel and the accuracy of the channel estimates.

For both conventional MIMO systems described above, the transmitter processes and transmits each data packet for each spatial channel at the rate selected for that spatial channel. The receiver decodes each data packet received on each spatial channel and determines whether the packet is decoded correctly or in error. The receiver may send back an acknowledgment (ACK) if the packet is decoded correctly or a negative acknowledgment (NAK) if the packet is decoded in error. The transmitter may retransmit each data packet decoded in error by the receiver, in its entirety, upon receiving a NAK for the packet.

The performance of both MIMO systems described above is highly dependent on the accuracy of the rate selection. If the selected rates for the spatial channels are too conservative (e.g., because the actual SINRs are much better than the SINR estimates), then excessive system resources are expended to transmit data packets and channel capacity is underutilized. Conversely, if the selected rates for the spatial channels are too aggressive, then the data packets may be decoded in error by the receiver and system resources may be expended to retransmit these packets. Rate selection for a MIMO system is challenging because of (1) greater complexity in the channel estimation for a MIMO channel, (2) the time-varying and independent nature of the spatial channels, and (3) interaction among the multiple data streams transmitted on the spatial channels.

There is therefore a need in the art for techniques to efficiently transmit data on multiple spatial channels in a MIMO system and which do not require accurate rate selection in order to achieve good performance.

SUMMARY

Techniques for performing incremental redundancy (IR) transmission on multiple ($N_D$) parallel channels in a MIMO system are provided herein. These parallel channels may be formed (1) by the multiple spatial channels in the MIMO system, (2) in a manner such that they achieve similar SINRs, or (3) in some other manners. Initially, a receiver or a transmitter in the MIMO system estimates the SINRs for the $N_D$ parallel channels and selects $N_D$ rates for these parallel channels. The SINRs may be dependent on various factors such as the transmission scheme used by the transmitter, the processing performed by the receiver, and so on. The transmitter is provided with the selected rates if the receiver performs the rate selection.

The transmitter processes (e.g., encodes, partitions, interleaves, and modulates) each data packet for each parallel channel based on the rate selected for that channel and obtains multiple ($N_B$) data symbol blocks for the packet. The first data symbol block typically contains sufficient information to allow the receiver to recover the data packet under favorable channel conditions. Each of the remaining data symbol blocks contains additional redundancy to allow the receiver to recover the data packet under less favorable channel conditions. For each data packet, the transmitter transmits one data symbol block at a time until all blocks for the packet are transmitted. The transmitter terminates the transmission of a data packet early if the packet is recovered (i.e., decoded successfully) by the receiver with fewer than all data symbol blocks.

The receiver performs detection on $N_R$ sequences of received symbols and obtains a detected symbol block for each data symbol block transmitted by the transmitter. The subsequent processing is dependent on whether the parallel channels are independent or inter-dependent.

The $N_D$ parallel channels are independent if data transmission on each parallel channel is independent of data transmission on other parallel channels. In this case, for each data packet on each parallel channel, the receiver processes (e.g., demodulates, deinterleaves, re-assembles, and decodes) all detected symbol blocks obtained for the data packet and provides a decoded packet. The receiver may send back an ACK if the decoded packet is good and a NAK if the decoded packet is in error. The receiver terminates the processing for each data packet that is recovered or if all data symbol blocks have been received for the packet.

The $N_D$ parallel channels are inter-dependent if data transmission on each parallel channel is dependent on data transmission on other parallel channels. This is the case if the receiver uses a "successive interference cancellation" (SIC) processing technique to obtain the detected symbol blocks. With SIC, whenever a data packet is recovered on a parallel channel, the interference this packet causes to not yet recovered data packets on other parallel channels is estimated and canceled prior to performing the detection to obtain the detected symbol blocks for these other data packets. The SINRs for later recovered data packets are thus higher, and higher rates may be selected for these packets. The data packets are then recovered by the receiver in a particular order, determined based on their selected rates, so that the SINRs needed to recover these data packets can be attained.

For an "ordered" SIC transmission scheme, if a data packet on a given parallel channel x is recovered earlier than expected, then one of several options are available. First, the transmitter can transmit nothing on parallel channel x and use more or all transmit power for the data packets not yet recovered. Second, the transmitter can transmit a new "short" data packet on parallel channel x. The short packet is expected to be recovered at or before the next data packet to be recovered. Third, the transmitter can transmit a new "long" data packet on parallel channel x. The long packet is expected to be recovered after the next data packet to be recovered. One of these options may be selected based on a metric that compares throughputs with and without packet transmission on parallel channel x after the early termination.

For a "cycled" SIC transmission scheme, whenever a data packet is recovered for a parallel channel, the transmitter transmits a new data packet on this parallel channel, and the receiver cycles to the next parallel channel and attempts to recover a data packet on this next parallel channel.

The SIC and other transmission schemes are described below. Various aspects and embodiments of the invention are also described in further detail below.

BRIEF DESCRIPTION OF THE DRAWINGS

The features and nature of the present invention will become more apparent from the detailed description set forth below when taken in conjunction with the drawings in which like reference characters identify correspondingly throughout and wherein:

FIG. 4 shows a transmission scheme for a MIMO-OFDM system;

FIG. 7 shows plots of PER for Packet 1b and Packet 2a versus number of transmission cycles for Packet 2a;

FIGS. 9A and 9B illustrate the cycled SIC transmission scheme;

DETAILED DESCRIPTION

The word "exemplary" is used herein to mean "serving as an example, instance, or illustration." Any embodiment or design described herein as "exemplary" is not necessarily to be construed as preferred or advantageous over other embodiments or designs.

For a MIMO system, $N_D$ data streams may be transmitted simultaneously on $N_D$ parallel channels, one data stream on each parallel channel, where $N_D > 1$. Each parallel channel may correspond to a spatial channel or may be formed in some other manner, as described below. Each data stream may be processed independently based on a rate selected for that data stream and transmitted on its parallel channel.

Figure 1:
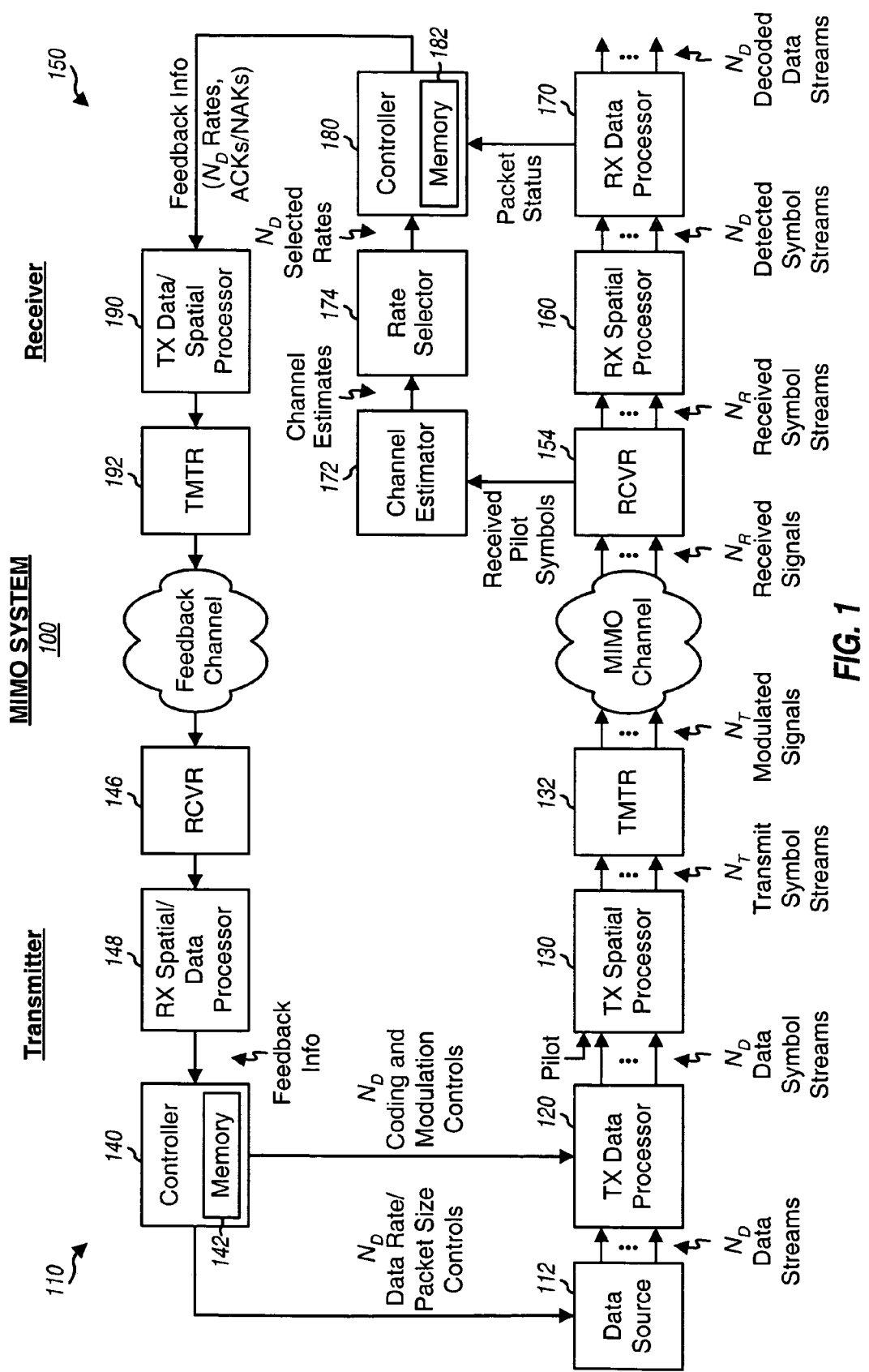
FIG. 1 shows a block diagram of a transmitter and a receiver in a MIMO system that implements IR transmission for multiple ($N_D$) parallel channels.

FIG. 1 shows a block diagram of a transmitter 110 and a receiver 150 in a MIMO system 100 that implements IR transmission for multiple data streams on multiple parallel channels. At transmitter 110, a TX data processor 120 receives $N_D$ data streams from a data source 112. TX data processor 120 processes (e.g., formats, encodes, partitions, interleaves, and modulates) each data packet in each data stream in accordance with a rate selected for that data stream and provides $N_B$ data symbol blocks for the packet, where $N_B \geq 1$ and may be dependent on the selected rate. Each data symbol block can be transmitted in one time slot (or simply, "slot"), which is a predetermined time period for MIMO system 100. The selected rate for each data stream may indicate the data rate, coding scheme or code rate, modulation scheme, packet size, number of data symbol blocks, and so on, which are indicated by the various controls provided by a controller 140. The selected rate for each data stream may be static or continually updated (e.g., based on channel conditions). For IR transmission of a given data stream, the data symbol blocks for each data packet of that data stream are transmitted one block at a time until the packet is recovered by receiver 150 or all blocks have been transmitted.

A TX spatial processor 130 receives $N_D$ data symbol streams from TX data processor 120. Each data symbol stream includes a set of data symbol blocks for each data packet in the corresponding data stream. TX spatial processor 130 performs processing (e.g., demultiplexing, spatial processing, and so on) to transmit the $N_D$ data symbol streams from $N_T$ transmit antennas. Various transmission schemes may be implemented, as described below. Depending on the transmission scheme selected for use, up to $N_D$ data symbol blocks for up to $N_D$ data streams are transmitted simultaneously on up to $N_D$ parallel channels in any given slot. TX spatial processor 130 also multiplexes in pilot symbols, which are used for channel estimation by receiver 150, and provides $N_T$ transmit symbol streams to a transmitter unit (TMTR) 132.

Transmitter unit 132 receives and conditions (e.g., converts to analog, frequency upconverts, filters, and amplifies) the $N_T$ transmit symbol streams to obtain $N_T$ modulated signals. Each modulated signal is then transmitted from a respective transmit antenna (not shown in FIG. 1) and via the MIMO channel to receiver 150. The MIMO channel distorts the $N_T$ transmitted signals with a MIMO channel response and further degrades the transmitted signals with additive white Gaussian noise and possibly interference from other transmitters.

At receiver 150, the $N_T$ transmitted signals are received by each of $N_R$ receive antennas (not shown in FIG. 1), and the $N_R$ received signals from the $N_R$ receive antennas are provided to a receiver unit (RCVR) 154. Receiver unit 154 conditions, digitizes, and pre-processes each receive signal to obtain a received symbol stream. Receiver unit 154 provides $N_R$ received symbol streams (for data) to an RX spatial processor 160 and received pilot symbols (for pilot) to a channel estimator 172. RX spatial processor 160 processes (e.g., detects, multiplexes, demultiplexes, and so on) the $N_R$ received symbol streams to obtain $N_D$ detected symbol streams, which are estimates of the $N_D$ data symbol streams sent by transmitter 110.

An RX data processor 170 receives and processes the $N_D$ detected symbol streams to obtain $N_D$ decoded data streams, which are estimates of the $N_D$ data streams sent by transmitter 110. For each data packet of each data stream, RX data processor 170 processes (e.g., demodulates, deinterleaves, re-assembles, and decodes) all data symbol blocks received for that data packet in accordance with the selected rate and provides a decoded packet, which is an estimate of the data packet. RX data processor 170 also provides the status of each decoded packet, which indicates whether the packet is decoded correctly or in error.

Channel estimator 172 processes the received pilot symbols and/or received data symbols to obtain channel estimates (e.g., channel gain estimates and SINR estimates) for the $N_D$ parallel channels. A rate selector 174 receives the channel estimates and selects a rate for each of the $N_D$ parallel channels. A controller 180 receives the $N_D$ selected rates from rate selector 174 and the packet status from RX data processor 170 and assembles feedback information for transmitter 110. The feedback information may include the $N_D$ selected rates, ACKs and NAKs for the decoded packets, and so on. The feedback information is processed by a TX data/spatial processor 190, further conditioned by a transmitter unit 192, and transmitted via a feedback channel to transmitter 110.

At transmitter 110, the signal(s) transmitted by receiver 150 are received and conditioned by a receiver unit 146 and further processed by an RX spatial/data processor 148 to obtain the feedback information sent by receiver 150. Controller 140 receives the feedback information, uses the ACKs/NAKs to control the IR transmission of current data packets being sent on the $N_D$ parallel channels, and uses the $N_D$ selected rates to process new data packets to be sent on the $N_D$ parallel channels.

Controllers 140 and 180 direct the operation at transmitter 110 and receiver 150, respectively. Memory units 142 and 182 provide storage for program codes and data used by controllers 140 and 180, respectively. Memory units 142 and 182 may be internal to controllers 140 and 180, as shown in FIG. 1, or external to these controllers. The processing units shown in FIG. 1 are described in detail below.

Figure 2:
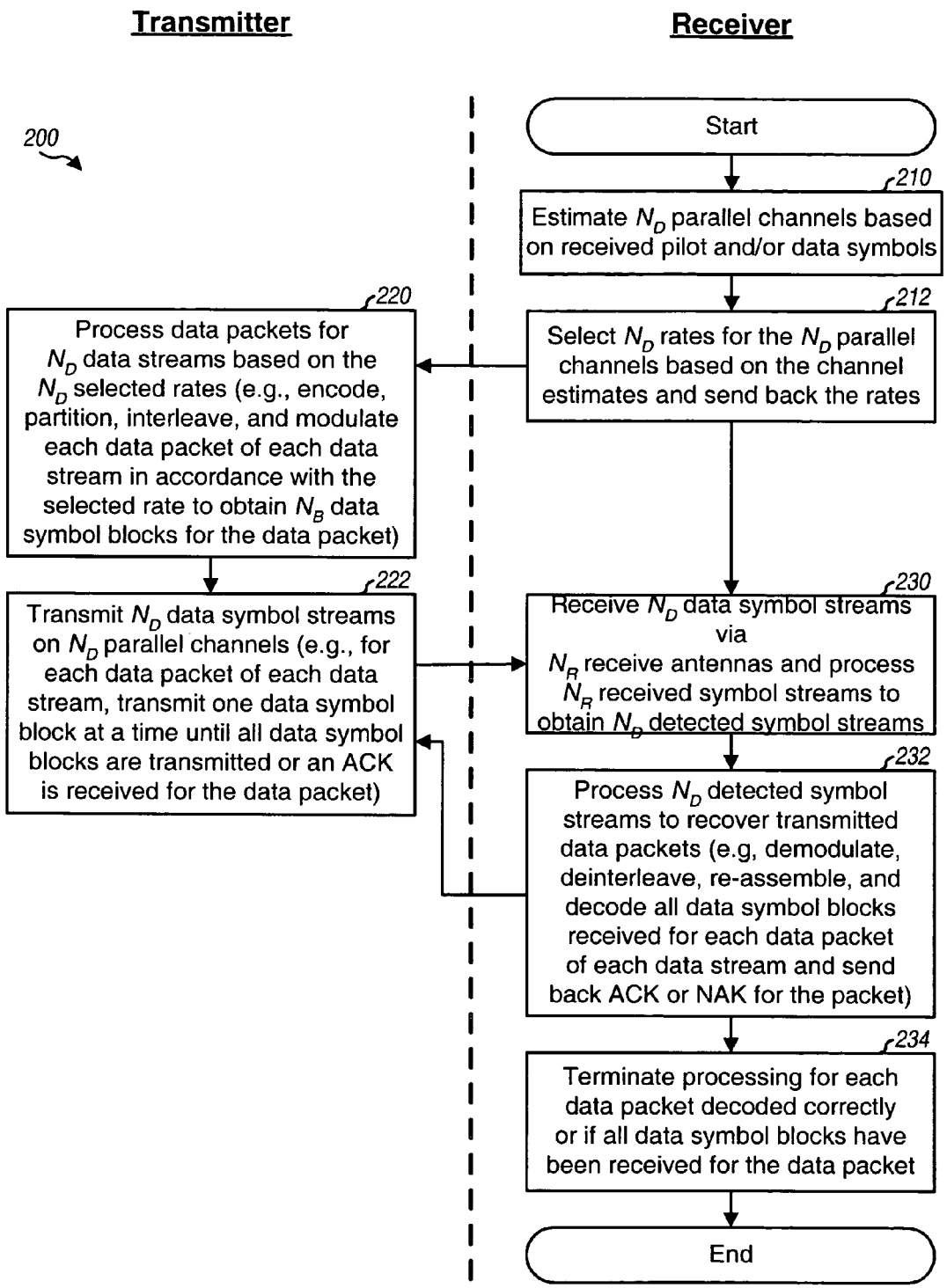
FIG. 2 shows a process for performing IR transmissions for parallel channels.

FIG. 2 shows a flow diagram of a process 200 for performing IR transmissions for $N_D$ data streams on $N_D$ parallel channels in the MIMO system. Initially, the receiver estimates the $N_D$ parallel channels based on pilot and/or data symbols received from the transmitter (step 210). The receiver selects a rate for each of the $N_D$ parallel channels based on the channel estimates and sends $N_D$ selected rates to the transmitter (step 212). The transmitter receives $N_D$ selected rates and processes data packets for the $N_D$ data streams in accordance with the $N_D$ selected rates to obtain $N_D$ data symbol streams (step 220). The transmitter may format, encode, partition, interleave, and modulate each data packet of each data stream in accordance with the rate selected for that data stream to obtain $N_B$ data symbol blocks for the data packet. The transmitter then transmits $N_D$ data symbol streams on $N_D$ parallel channels (step 222). For example, the transmitter may transmit one data symbol block at a time for each data packet of each data stream until all data symbol blocks are transmitted or an ACK is received for the data packet. Various transmission schemes may be used for IR transmission of $N_D$ data streams, as described below.

The receiver receives the $N_D$ data symbol streams from the transmitter via $N_R$ receive antennas and processes $N_R$ received symbol streams to obtain $N_D$ detected symbol streams (step 230). The receiver then processes the $N_D$ detected symbol streams and recovers the data packets transmitted by the transmitter (step 232). For each slot, the receiver may attempt to recover the current data packet being transmitted for each of the $N_D$ data streams. For example, whenever a new detected symbol block is obtained for a data packet, the receiver may demodulate, deinterleave, re-assemble, and decode all detected symbol blocks received for that packet to obtain a decoded packet. The receiver also checks each decoded packet to determine whether the packet is decoded correctly (good) or in error (erased) (also step 232).

The ACK/NAK feedback may be achieved in various manners. In one embodiment, the receiver sends a NAK for each decoded packet that is erased, and the transmitter uses this feedback to transmit the next data symbol block for the erased packet. In another embodiment, the transmitter sends one data symbol block at a time for each data packet until an ACK is received for the packet from the receiver (the receiver may or may not send back NAKs). In any case, the receiver terminates the processing for each data packet that is recovered or if all data symbol blocks have been received for the packet (step 234).

FIG. 2 shows a specific embodiment of IR transmission for $N_D$ data streams on $N_D$ parallel channels. IR transmission for multiple parallel channels may also be performed in other manners, and this is within the scope of the invention.

Figure 3:
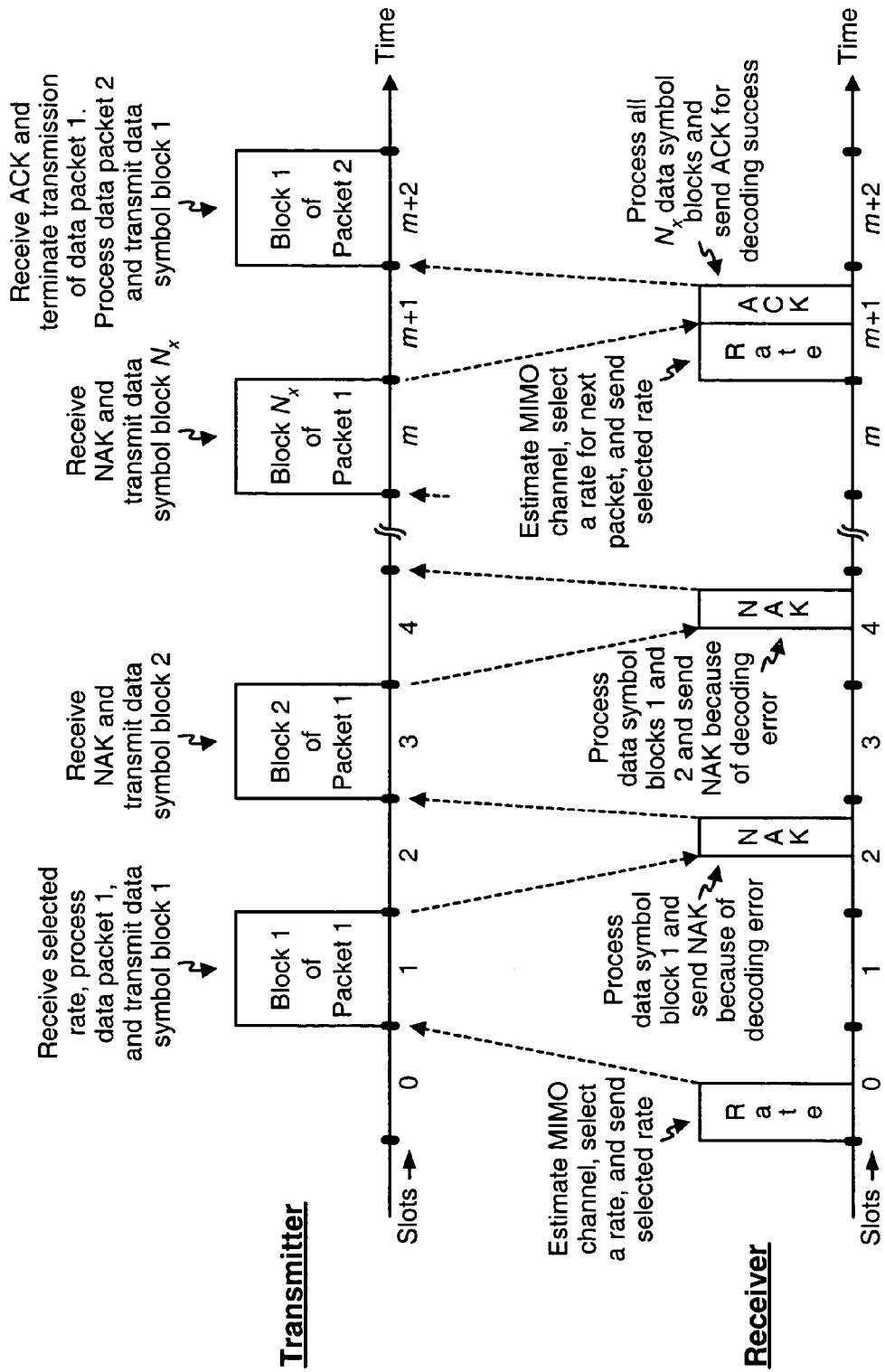
FIG. 3 illustrates IR transmission for one data stream on one parallel channel.

FIG. 3 illustrates IR transmission for one data stream (denoted as Stream i) on one parallel channel (denoted as Channel i). The receiver estimates Channel i, selects a rate $r_{i,1}$ for Channel i based on the channel estimates, and sends the selected rate to the transmitter in slot 0. The transmitter receives the selected rate, processes a data packet (Packet 1) for Stream i in accordance with the selected rate, and transmits the first data symbol block (Block 1) for Packet 1 in slot 1. The receiver receives and processes Block 1, determines that Packet 1 is decoded in error, and sends back a NAK in slot 2. The transmitter receives the NAK and transmits the second data symbol block (Block 2) for Packet 1 in slot 3. The receiver receives Block 2, processes Blocks 1 and 2, determines that Packet 1 is still decoded in error, and sends back a NAK in slot 4. The block transmission and NAK response may repeat any number of times. In the example shown in FIG. 3, the transmitter receives a NAK for data symbol block $N_x-1$ and transmits data symbol block $N_x$ (Block $N_x$) for Packet 1 in slot m, where $N_x$ is less than or equal to the total number of blocks for Packet 1. The receiver receives Block $N_x$, processes all $N_x$ data symbol blocks received for Packet 1, determines that the packet is decoded correctly, and sends back an ACK in slot m+1. The receiver also estimates Channel i, selects a rate $r_{i,2}$ for the next data packet for Stream i, and sends the selected rate to the transmitter in slot m+1. The transmitter receives the ACK for Block $N_x$ and terminates the transmission of Packet 1. The transmitter also processes the next data packet (Packet 2) in accordance with the selected rate $r_{i,2}$ and transmits the first data symbol block for Packet 2 in slot m+2. The processing at the transmitter and receiver for Packet 2 continues in the same manner described for Packet 1.

For the embodiment shown in FIG. 3, there is a delay of one slot for the ACK/NAK response from the receiver for each block transmission. To improve channel utilization, multiple data packets may be transmitted for each data stream in an interlaced manner. For example, one data packet may be transmitted in odd-numbered slots and another data packet may be transmitted in even-numbered slots. More than two data packets may also be interlaced if the ACK/NAK delay is longer than one slot.

The $N_D$ parallel channels in the MIMO system may be formed in various manners, as described below. Moreover, depending on the processing performed at the receiver, the $N_D$ parallel channels may be independent of one another or inter-dependent. For independent parallel channels, the IR transmission for each data stream may be performed independent of, and without regard to, the IR transmission for the other data streams. For inter-dependent parallel channels, the IR transmission for each data stream is dependent on the IR transmission for the other data streams.

1. IR Transmission for Multiple Independent Parallel Channels

Various transmission schemes may be used to transmit $N_D$ data streams simultaneously on $N_D$ parallel channels, where $N_D > 1$. Some exemplary transmission schemes are described below. For simplicity, the following description assumes a full rank MIMO channel and $N_D \leq N_S = N_T \leq N_R$.

In a first transmission scheme, one data stream is transmitted from each of the $N_T$ transmit antennas, without any spatial processing at the transmitter. The model for this transmission scheme may be expressed as:

$$r_{nsp} = Hs + n, \qquad \text{Eq (1)}$$

where
- s is an $\{N_T \times 1\}$ data vector with $N_T$ entries for data symbols;
- $r_{nsp}$ is an $\{N_R \times 1\}$ receive vector with $N_R$ entries for $N_R$ received symbols obtained via the $N_R$ receive antennas;
- H is an $\{N_R \times N_T\}$ channel response matrix for the MIMO channel; and
- n is a vector of additive white Gaussian noise (AWGN).

The vector s includes $N_T$ entries for the $N_T$ transmit antennas, with $N_D$ entries being set to $N_D$ data symbols for the $N_D$ data streams and the remaining $N_T - N_D$ entries being set to zero. The vector n is assumed to have zero mean and a covariance matrix of $\Lambda_n = \sigma^2 I$, where $\sigma^2$ is the variance of the noise and I is the identity matrix with ones along the diagonal and zeros everywhere else.

Due to scattering in the MIMO channel, the $N_D$ data streams transmitted from the $N_T$ transmit antennas interfere with each other at the receiver. A data stream transmitted from a given transmit antenna may be received by all $N_R$ receive antennas at different amplitudes and phases. The received signal for each receive antenna would then include a component of each of the $N_D$ data streams.

The receiver may estimate the data vector s based on various spatial and space-time processing (i.e., "detection") schemes. For example, the receiver may estimate the data vector s with a maximal ratio combining (MRC) detector, a minimum mean square error (MMSE) detector, a linear zero-forcing (ZF) detector (which is also referred to as a channel correlation matrix inversion (CCMI) detector), an MMSE linear equalizer, a decision feedback equalizer, or some other detector/equalizer. The spatial processing for some of these detectors is described below.

The spatial processing for an MRC detector may be expressed as:

$$\hat{s}_{mrc} = \underline{W}_{mrc}^H r_{nsp}, \qquad \text{Eq (2)}$$

where
- $W_{mrc}$ is the response of the MRC detector, which is $W_{mrc} = H$;
- $\hat{s}_{mrc}$ is an $\{N_T \times 1\}$ vector of $N_T$ detected symbols from the MRC detector; and "$^H$" denotes the conjugate transpose.

The spatial processing for an MMSE detector may be expressed as:

$$\hat{s}_{mmse} = \underline{W}_{mmse}^H r_{nsp}, \qquad \text{Eq (3)}$$

where $W_{mmse} = (HH^H + \sigma^2 I)^{-1} H$ for the MMSE detector.

The spatial processing for a zero-forcing detector may be expressed as:

$$\hat{s}_{zf} = \underline{W}_{zf}^H r_{nsp}, \qquad \text{Eq (4)}$$

where $W_{zf} = H(H^H H)^{-1}$ for the zero-forcing detector. For the first transmission scheme, each spatial channel corresponds to a respective transmit antenna.

In a second transmission scheme, one data stream is transmitted on each "eigenmode" of the MIMO channel. The channel response matrix H may be decomposed using either singular value decomposition or eigenvalue decomposition to obtain $N_S$ eigenmodes of the MIMO channel. The $N_S$ eigenmodes of the MIMO channel are orthogonal to one another, and improved performance may be attained by transmitting multiple data streams via these eigenmodes. The singular value decomposition of the channel response matrix H may be expressed as:

$$H = U \Sigma V^H, \qquad \text{Eq (5)}$$

where
- U is an $\{N_R \times N_R\}$ unitary matrix of left eigenvectors of H;
- $\Sigma$ is an $\{N_R \times N_T\}$ diagonal matrix of singular values of H; and
- V is an $\{N_T \times N_T\}$ unitary matrix of right eigenvectors of H.

A unitary matrix is characterized by the property $M^H M = I$. The unitary matrices V and U are used for spatial processing by the transmitter and receiver, respectively, to transmit $N_D$ data streams on the $N_S$ eigenmodes of the MIMO channel.

The transmitter performs spatial processing with the matrix V, as follows:

$$x_{svd} = Vs, \qquad \text{Eq (6)}$$

where $x_{svd}$ is an $\{N_T \times 1\}$ vector with $N_T$ entries for $N_T$ transmit symbols sent from the $N_T$ transmit antennas. The receive vector is then given as: $r_{svd} = HVs + n$. The receiver performs spatial processing with the matrix U, as follows:

$$\hat{s}_{svd} = \Sigma^{-1} U^H r_{svd}. \qquad \text{Eq (7)}$$

For the second transmission scheme, each spatial channel corresponds to a respective eigenmode. The $N_S$ eigenmodes may be viewed as orthogonal spatial channels obtained through decomposition.

For the first and second transmission schemes, the $N_D$ data streams may achieve different and possibly widely varying "post-processed" or "post-detection" SINRs, which are the SINRs achieved after linear detection by the receiver (e.g., with an MMSE, zero-forcing, or MRC detector). Different rates are then needed for the data streams.

In a third transmission scheme, each of the $N_D$ data streams is transmitted from all $N_T$ transmit symbols such that all data streams experience similar channel conditions and achieve similar post-processed SINRs. The same or similar rates may then be used for the $N_D$ data streams. For this scheme, the transmitter performs matrix multiplication of the data vector s with a transmit basis matrix and a diagonal matrix as follows:

$$x_{tbm} = M\Lambda s, \qquad \text{Eq (8)}$$

where $x_{tbm}$ is an $\{N_T \times 1\}$ vector with $N_T$ transmit symbols for the $N_T$ transmit antennas;

M is an $\{N_T \times N_T\}$ transmit basis matrix, which is a unitary matrix; and $\Lambda$ is an $\{N_T \times N_T\}$ diagonal matrix.

The transmit basis matrix M allows each data stream to be sent from all $N_T$ transmit antennas and further allows the full power $P_{ant}$ of each transmit antenna to be used for data transmission. The matrix M may be defined as $$M = \frac{1}{\sqrt{N_T}} E,$$

where E is a Walsh-Hadamard matrix. The matrix M may also be defined as $$M = \frac{1}{\sqrt{N_T}} F,$$

where F is a discrete Fourier transform (DFT) matrix with the (m,n)-th entry defined as $$f_{m,n} = e^{-j2\pi \frac{(m-1)(n-1)}{N_T}},$$

where m is a row index and n is a column index for the matrix F, with $m = 1 \ldots N_T$ and $n = 1 \ldots N_T$. The diagonal matrix $\Lambda$ include $N_D$ non-zero entries along the diagonal and zeros elsewhere. These $N_D$ non-zero entries may be used to allocate different transmit powers to the $N_D$ data streams while conforming to the total transmit power constraint of $P_{ant}$ for each transmit antenna.

The "effective" channel response observed by the receiver for this transmission scheme is $H_{eff} = HM$. The receiver may estimate the data vector s using the MRC, MMSE, zero-forcing, or some other detector/equalizer, where the detector response W (which may be $W_{mrc}$, $W_{mmse}$, or $W_{zf}$) is computed with the effective channel response matrix $H_{eff}$ instead of the channel response matrix H. The third transmission scheme is described in detail in commonly assigned U.S. patent application Ser. No. 10/367,234 entitled "Rate Adaptive Transmission Scheme for MIMO Systems," filed Feb. 14, 2003.

The third transmission scheme can transmit any number of data streams simultaneously from $N_T$ transmit antennas (i.e., $1 \leq N_D \leq N_S$), allows the $N_D$ parallel channels to achieve similar post-processed SINRs (which can simplify the operation of a SIC receiver), and further allows the same or different transmit powers to be used for the data streams.

The IR transmission techniques described herein may be implemented in a single-carrier MIMO system that utilizes one carrier for data transmission and a multi-carrier MIMO system that utilizes multiple carriers for data transmission. Multiple carriers may be provided by orthogonal frequency division multiplexing (OFDM), other multi-carrier modulation techniques, or some other constructs. OFDM effectively partitions the overall system bandwidth into multiple ($N_F$) orthogonal subbands, which are also commonly referred to as tones, bins, or frequency channels. With OFDM, each subband is associated with a respective carrier that may be modulated with data.

For a MIMO system that implements OFDM (i.e., a MIMO-OFDM system), the $N_D$ data streams may be transmitted on the $N_F$ subbands of the $N_T$ transmit antennas in various manners. For example, each data stream may be transmitted on the $N_F$ subbands of a respective transmit antenna. Alternatively, each data stream may be transmitted on multiple subbands and multiple transmit antennas to achieve frequency and spatial diversity.

In a fourth transmission scheme, each data stream is transmitted diagonally across the $N_F$ subbands and from all $N_T$ transmit antennas. This scheme provides both frequency and spatial diversity for all $N_D$ data streams transmitted simultaneously and further achieves similar post-processed SINRs for the $N_D$ data streams after linear detection at the receiver.

FIG. 4 shows the fourth transmission scheme for a case in which two data streams ($N_D = 2$) are transmitted in an exemplary MIMO-OFDM system with four transmit antennas ($N_T = 4$) and 16 subbands ($N_F = 16$). For the first data stream, the first four data symbols $s_{1,1}$, $s_{1,2}$, $s_{1,3}$ and $s_{1,4}$ are transmitted on subbands 1, 2, 3 and 4, respectively, of transmit antennas 1, 2, 3 and 4, respectively. The next four data symbols $s_{1,5}$, $s_{1,6}$, $s_{1,7}$ and $s_{1,8}$ wrap around and are transmitted on subbands 5, 6, 7 and 8, respectively, of transmit antennas 1, 2, 3 and 4, respectively. For the second data stream, the first four data symbols $s_{2,1}$, $s_{2,2}$, $s_{2,3}$ and $s_{2,4}$ are transmitted on subbands 1, 2, 3 and 4, respectively, of transmit antennas 3, 4, 1 and 2, respectively. The next four data symbols $s_{2,5}$, $s_{2,6}$, $s_{2,7}$ and $s_{2,8}$ wrap around and are transmitted on subbands 5, 6, 7 and 8, respectively, of transmit antennas 3, 4, 1 and 2, respectively. For the embodiment shown in FIG. 4, not all subbands are used for data transmission and the unused subbands are filled with signal values of zero. The multiplexing/demultiplexing may also be performed in other manners.

For a MIMO-OFDM system, the spatial processing described above for the transmitter and receiver can be performed for each subband k, for $k = 1 \ldots N_F$, based on the channel response matrix H(k) for that subband.

For a MIMO system that implements orthogonal frequency division multiple access (i.e., a MIMO-OFDMA system), only a subset of the $N_F$ subbands may be available for data transmission to each receiver. The processing described above for the MIMO-OFDM system may also be used for the MIMO-OFDMA system, albeit only on the subbands available for data transmission. For example, the $N_D$ data streams for a given receiver may be transmitted diagonally across the available subbands (instead of all $N_F$ subbands) and from the $N_T$ transmit antennas.

The $N_D$ parallel channels may be formed in various manners in MIMO and MIMO-OFDM systems. The four transmission schemes described above represent four exemplary methods of forming multiple parallel channels. In general, the parallel channels may be formed using any combination of space, frequency, and time.

In the following description, a "transmission cycle" (or simply, a "cycle") is a time period covering the transmission of a data symbol block by the transmitter and the transmission of an NAK/ACK response for that block by the receiver. An "F" denotes decoding failure by the receiver and an "S" denotes decoding success. For simplicity, the interlacing of multiple data packets for each data stream is not shown in the following timing diagrams.

Figure 5:
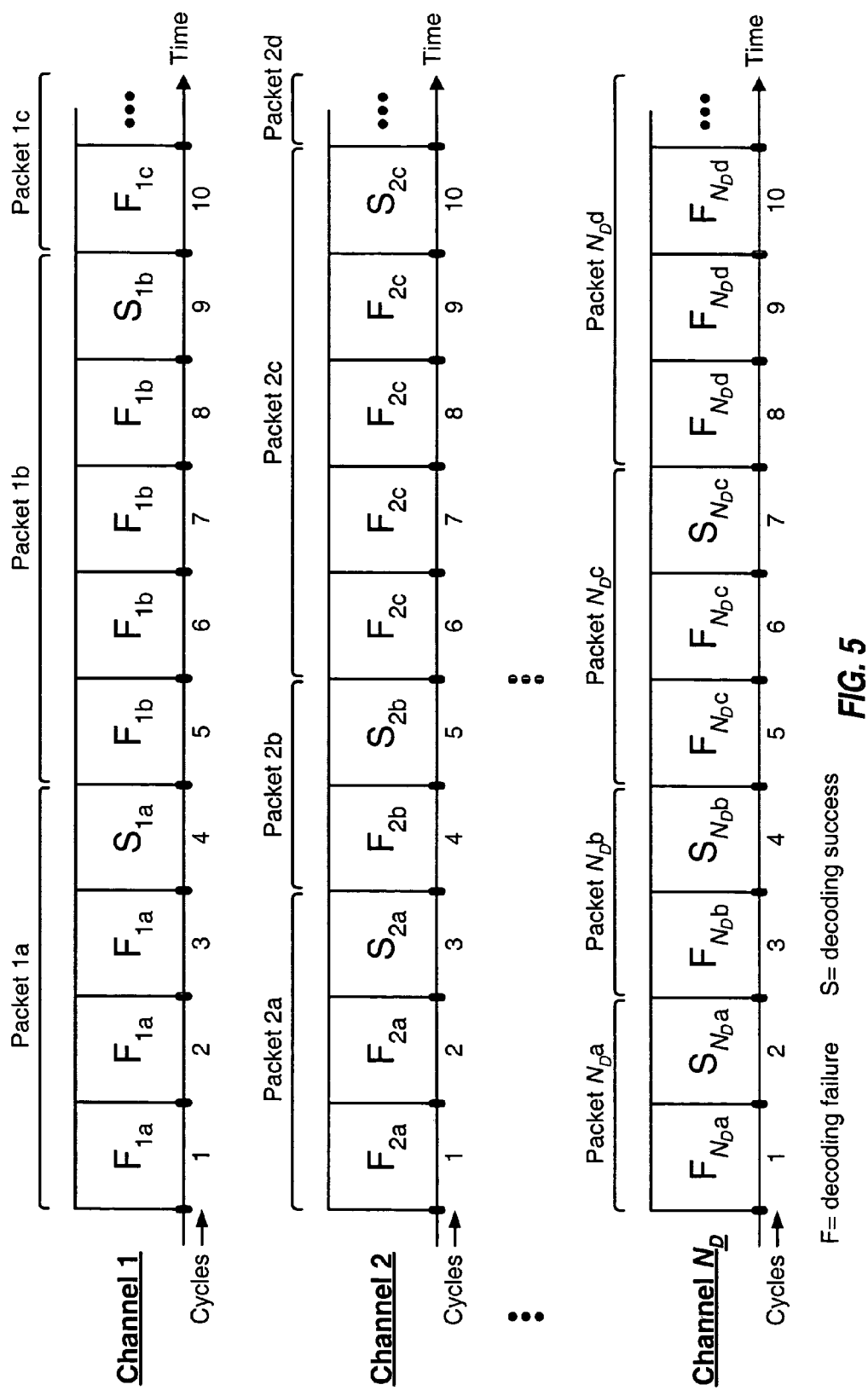
FIG. 5 illustrates IR transmission for $N_D$ independent parallel channels.

FIG. 5 illustrates IR transmission of $N_D$ data streams on $N_D$ independent parallel channels. Because these parallel channels are independent, the receiver can recover each data stream independently and provide an ACK/NAK feedback stream for that data stream. The transmitter sends a new data symbol block for the current data packet of each data stream in each cycle.

In the example shown in FIG. 5, for data stream 1 transmitted on parallel channel 1 (Channel 1), the receiver encounters a decoding failure ("$F_{1a}$") when attempting to recover data packet 1a (Packet 1a) with just data symbol block 1 in cycle 1, a decoding failure when attempting to recover Packet 1a with data symbol blocks 1 and 2 in cycle 2, a decoding failure when attempting to recover Packet 1a with data symbol blocks 1, 2 and 3 in cycle 3, and a decoding success ("$S_{1a}$") when attempting to recover Packet 1a with data symbol blocks 1 through 4 in cycle 4. The transmitter then terminates the transmission of Packet 1a and starts transmitting data symbol blocks for another data packet 1b (Packet 1b). The receiver attempts to recover Packet 1b whenever a new data symbol block is received for that packet, encounters a decoding failure in each of cycles 5 through 8, and is able to correctly decode Packet 1b with data symbol blocks 1 through 5 in cycle 9. The receiver processes each of the other data streams in similar manner, as shown in FIG. 5.

2. IR Transmission for Multiple Interdependent Parallel Channels

The receiver can process the $N_R$ received symbol streams using the SIC technique to obtain the $N_D$ detected symbol streams. For the SIC technique, which is a non-linear detection scheme, the receiver initially performs detection on the $N_R$ received symbol streams (e.g., using an MRC, MMSE, or zero-forcing detector) and obtains one detected symbol stream. The receiver further processes (e.g., demodulates, deinterleaves, and decodes) this detected symbol stream to obtain a decoded data stream. The receiver then estimates the interference this data stream causes to the other $N_D-1$ data streams and cancels the estimated interference from the $N_R$ received symbol streams to obtain $N_R$ modified symbol streams. The receiver then repeats the same processing on the $N_R$ modified symbol streams to recover another data stream.

The receiver thus processes the $N_R$ received symbol streams in $N_D$ successive stages. For each stage, the receiver performs (1) detection on either the $N_R$ received symbol streams or the $N_R$ modified symbol streams from the preceding stage to obtain one detected symbol stream, (2) decodes this detected symbol stream to obtain a corresponding decoded data stream, and (3) estimates and cancels the interference due to this stream to obtain $N_R$ modified symbol streams for the next stage. If the interference due to each data stream can be accurately estimated and canceled, which requires error-free or low-error recovery of the data stream, then later recovered data streams experience less interference and may be able to achieve higher post-processed SINRs. The SIC technique is described in further detail in commonly assigned U.S. patent application Ser. No. 09/993,087, entitled "Multiple-Access Multiple-Input Multiple-Output (MIMO) Communication System," filed Nov. 6, 2001.

For the SIC technique, the post-processed SINR of each data stream is dependent on (1) that stream's SINR with linear detection and without interference cancellation, (2) the particular stage in which the data stream is recovered, and (3) the interference due to later recovered data streams. Thus, even though the $N_D$ data streams may achieve similar post-processed SINRs with linear detection (e.g., using an MMSE, zero-forcing, or MRC detector), these streams will typically achieve different post-processed SINRs with non-linear detection using the SIC technique. In general, the post-processed SINR progressively improves for data streams recovered in later stages because the interference from data streams recovered in prior stages is canceled. This then allows higher rates to be used for later recovered data streams.

The SIC technique introduces interdependency among the data streams. In particular, the rates for the $N_D$ data streams are selected based on the post-processed SINRs achieved by these data streams, which are in turn dependent on the order in which the data streams are recovered. The post-processed SINR of each data stream assumes that all earlier data streams (i.e., those designated to be recovered prior to that data stream) have been successfully decoded and canceled. The receiver typically needs to recover the $N_D$ data streams in a designated order and normally cannot recover a given data stream until all earlier data streams have been recovered and canceled.

Various transmission schemes may be used for a MIMO system with a SIC receiver. Several exemplary transmission schemes are described below. For simplicity, the following description assumes two data streams ($N_D=2$) are transmitted on two parallel channels. However, the concepts described below may be extended to any number of data streams.

A. Ordered SIC Transmission Scheme

In an ordered SIC transmission scheme, the $N_D$ data streams are recovered in a designated order. For example, the receiver may recover data stream 1 first, then data stream 2 next, and so on, and data stream $N_D$ last. The designated order may be dependent on the manner in which the data streams are transmitted. For example, the received SINRs for the $N_D$ data streams are likely to be similar for the third and fourth transmission schemes described above. In this case, performance is minimally impacted by the order in which the $N_D$ data streams are recovered, and any order may be selected. The received SINRs for the $N_D$ data streams are likely to be different for the first transmission scheme described above. In this case, better performance may be attained by recovering the data stream with the highest received SINR first, then the data stream with the next highest received SINR, and so on. In any case, for the ordered SIC transmission scheme, the receiver attempts to recover data stream i only after the interference from all earlier data streams 1 to i−1 has been canceled.

Initially, the post-processed SINRs are estimated for the $N_D$ data streams based on (1) the received SINRs for the data streams, e.g., with equal transmit powers being used for the data streams, and (2) the designated order of recovering the data streams. The post-processed SINR of the data stream recovered in stage l, SINR pd (l), may be expressed as:

$$SINR_{pd}(l) = \frac{1}{\sigma^2 \|w_l\|^2},\qquad \text{Eq (9)}$$

where $w_l$ is the detector response for the stream recovered in stage l and $\sigma^2$ is the variance of the noise at the receiver. The detector response $w_l$ is one column of a (e.g., MRC, MMSE, or zero-forcing) detector response $W_l$ derived for stage l based on a reduced channel response matrix $H_l$ for that stage. The matrix $H_l$ is obtained by removing (l−1) columns in the original matrix H corresponding to the data streams already recovered in the (l−1) prior stages. The computation of the post-processed SINR is described in further detail in commonly assigned U.S. patent application Ser. No., entitled "Successive Interference Cancellation Receiver Processing with Selection Diversity," filed Sep. 23, 2003.

A rate is selected for each data stream based on its post-processed SINR. The rate selection does not need to be accurate because a data packet can be transmitted with a variable rate with IR transmission. The sizes of the $N_D$ data packets to be transmitted for the $N_D$ data streams are selected, given the selected rates, such that all data packets are expected to be recovered by the receiver in the same number of cycles ($N_{est}$), where $N_{est}$ can be determined based on a conservative estimate of the post-processed SINRs. The transmission for each data packet may be terminated early if the packet is recovered prior to cycle $N_{est}$ and may be extended past cycle $N_{est}$ if necessary until the packet is recovered.

Figure 6A:
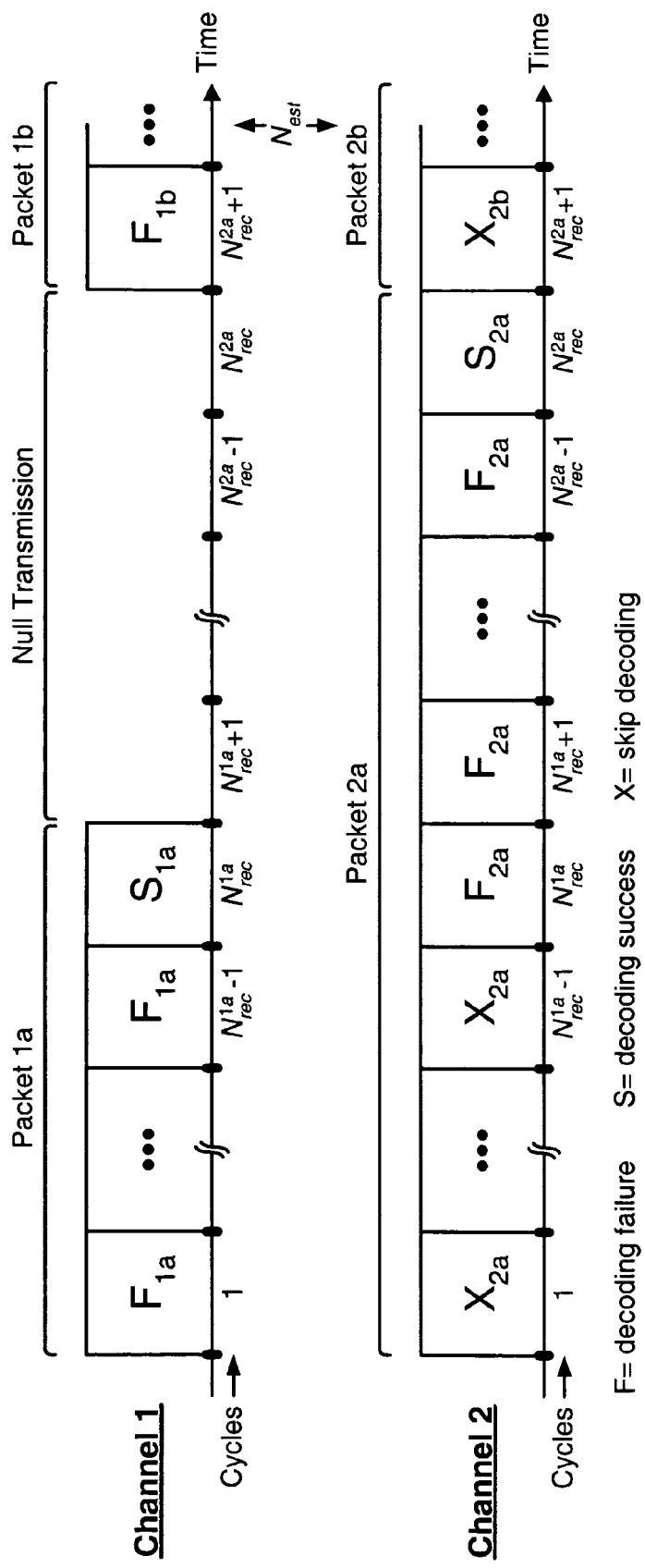
FIGS. 6A through 6C illustrate the ordered SIC transmission scheme with three different options for early termination of a data packet on one parallel channel.
Figure 6B:
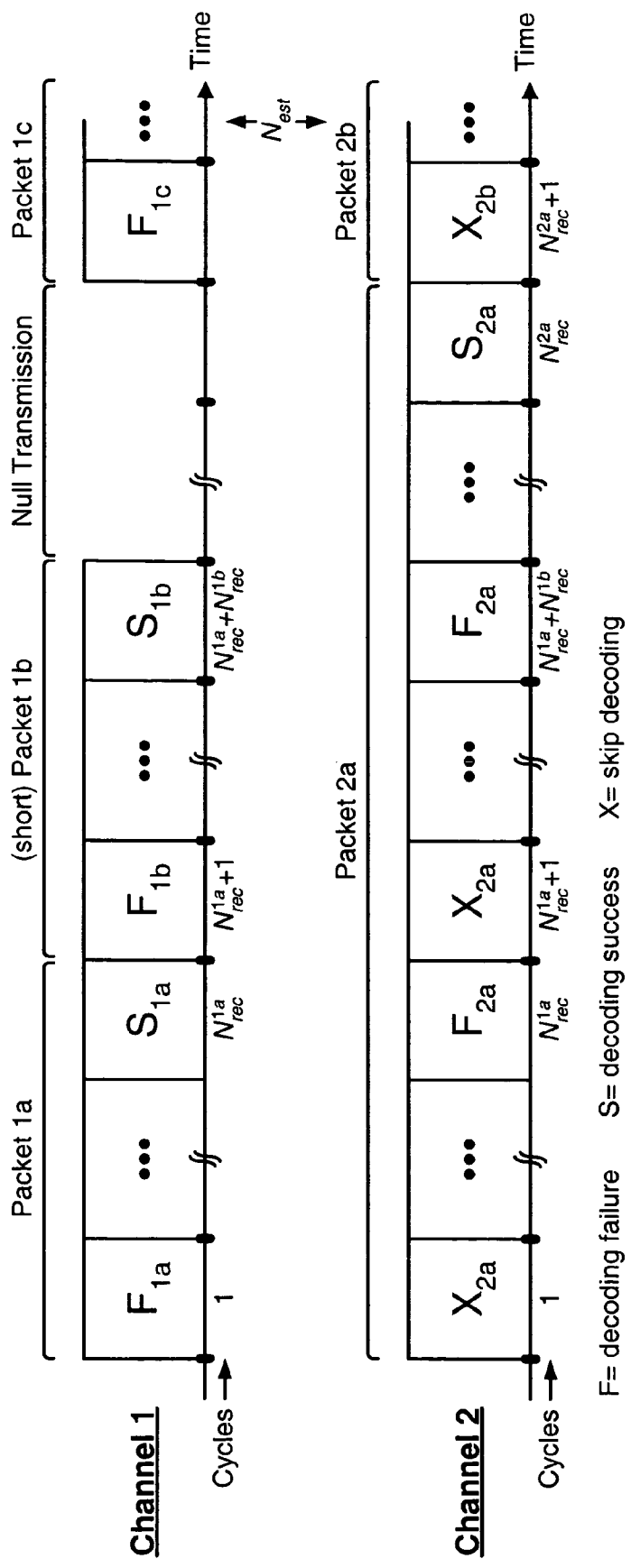
Figure 6C:
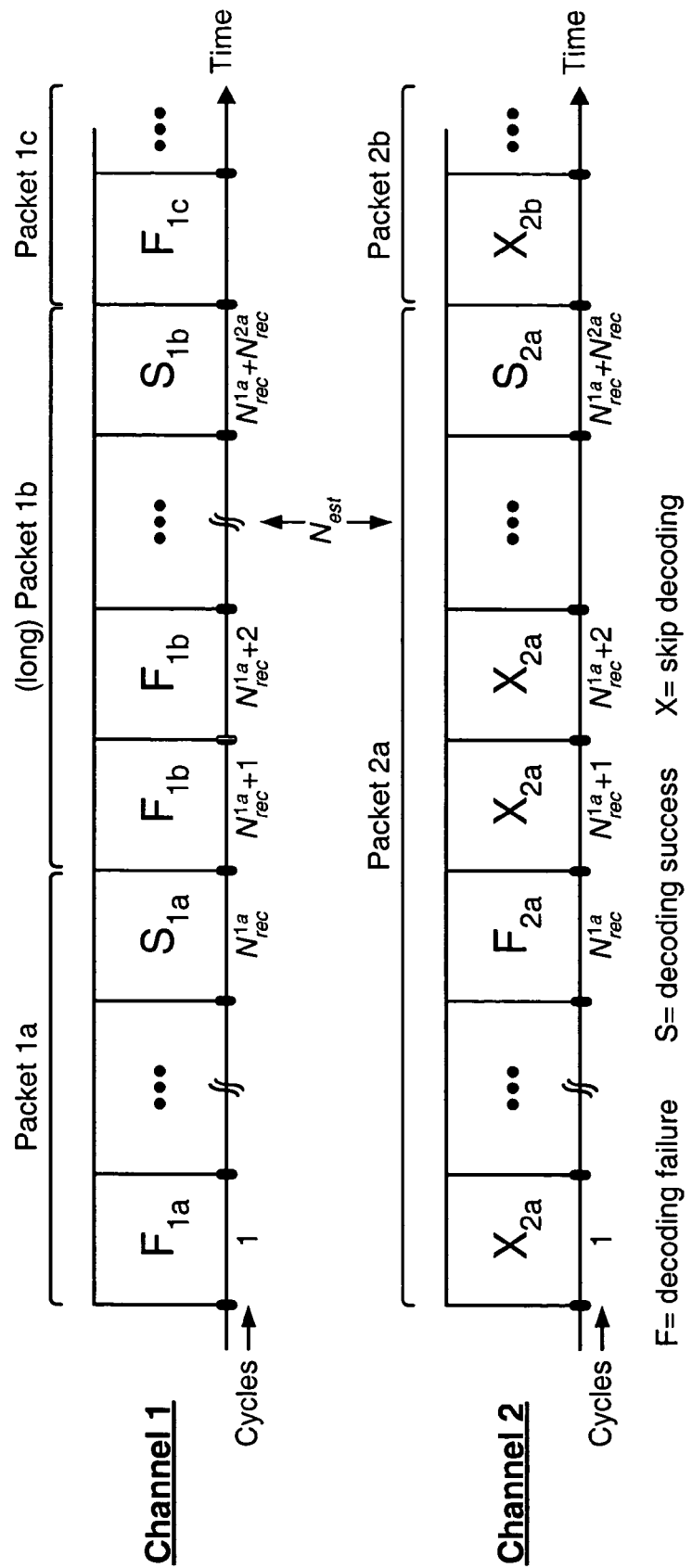

FIGS. 6A through 6C illustrate the ordered SIC transmission scheme with three different transmission options for early termination of a data packet on one data stream. In FIGS. 6A through 6C, two new data packets (Packets 1a and 2a) are transmitted starting in cycle 1 for data streams 1 and 2 on parallel channels 1 and 2 (Channels 1 and 2), respectively. If Packet 1a for data stream 1 is recovered in cycle $$N_{rec}^1,$$

which is before cycle $N_{est}$, then a goal of this transmission scheme is to synchronize both data streams as soon as possible without losing spectral efficiency. Table 1 shows some options available if Packet 1a is recovered before cycle $N_{est}$.

TABLE 1

| Option | Description |
|---|---|
| 1 | Do not transmit anything on Channel 1 and use all transmit power for Packet 2a on Channel 2 after Packet 1a has been recovered, as shown in FIG. 6A.<br>This improves the likelihood of recovering Packet 2a before cycle $N_{est}$. |
| 2 | Transmit a new 'short' data packet on Channel 1, as shown in FIG. 6B. The short packet has a length of<br><br>$N_{short}^1$, where $N_{short}^1 \leq N_{rem}^1$ and $N_{rem}^1 = N_{est} - N_{rec}^1$.<br><br>The rate for the short packet is selected based on the channel estimates obtained in cycle $N_{rec}^1$. |

TABLE 1-continued

| Option | Description |
|---|---|
| 3 | Transmit a new 'long' data packet on Channel 1, as shown in FIG. 6C. The long packet has a length of<br><br>$N_{long}^1$, where $N_{long}^1 > N_{rem}^1$.<br><br>This may delay the recovery of Packet 2a until cycle<br><br>$N_{rem}^1 + N_{long}^1$,<br><br>which is the cycle in which the long packet is expected to be recovered. |

In Table 1, $$N_{short}^1 \text{ and } N_{long}^1$$

(similar to $N_{est}$) represent the number of cycles in which the short and long data packets are expected to be recovered, based on a conservative estimate of the post-processed SINRs.

A metric may be used to select one of the three options shown in Table 1 whenever early termination is encountered. This metric may be defined based on accumulated throughput and defined as follows:

$$R_1(N_{rec}^1, N_{long}^1) > R_2(0, N_{est}) - R_2(0, N_{rec}^1 + N_{long}^1), \qquad \text{Eq (10)}$$

where $R_i(j,n)$ is the accumulated throughput predicted at cycle j for data stream i after n cycles. The left side of the inequality in equation (10) represents the gain in the accumulated throughput ($\Delta R_{1,long}$) for Channel 1 with a new long packet transmitted on Channel 1. The right side of the inequality in equation (10) represents the reduction of the accumulated throughput ($\Delta R_{2,long}$) for Channel 2 because of the new long packet transmission on Channel 1. The term $R_2(0, N_{est})$ denotes the accumulated throughput for Channel 2 if Packet 2a is recovered in cycle $N_{est}$, as predicted. The term $$R_2(0, N_{rec}^1 + N_{long}^1)$$

denotes the accumulated throughput for Channel 2 if the transmission for Packet 2a extends to cycle $$N_{rec}^1 + N_{long}^1$$

because of the long packet transmission on Channel 1. The difference between these two terms represents the reduction in the accumulated throughput for Channel 2. A new long packet may thus be transmitted on Channel 1 if the gain in accumulated throughput for Channel 1 is greater than the reduction in accumulated throughput for Channel 2 (i.e., Option 3 in Table 1 may be selected if equation (10) is true.)

Equation (10) assumes that $N_{est}$ cycles are needed to recover Packet 2a even if the total transmit power is used for Packet 2a after Packet 1a has been recovered in cycle $$N_{rec}^1.$$

This is a pessimistic assumption since the likelihood of recovering Packet 2a before cycle $N_{est}$ improves when higher transmit power is used for Packet 2a after cycle $$N_{rec}^1.$$

Equation (10) may be modified as follows:

$$R_1(N_{rec}^1, N_{long}^1) > R_2(0, N_{est}^{power}) - R_2(0, N_{rec}^1 + N_{long}^1), \qquad \text{Eq (11)}$$

where $$N_{est}^{power}$$

is the number of cycles predicted to be required to recover Packet 2a with all transmit power used for Packet 2a after cycle $$N_{rec}^1,$$

where $$N_{est}^{power} < N_{est}.$$

FIG. 6A shows IR transmission with null transmission for early termination (Option 1 in Table 1). In FIG. 6A, two new data blocks are transmitted for Packets 1a and 2a on Channels 1 and 2 in each of cycles 1 through $$N_{rec}^{1a}.$$

For each cycle, the receiver attempts to recover Packet 1a based on all data symbol blocks received for Packet 1a and does not attempt to recover Packet 2a ("$X_{2a}$"). The receiver encounters decoding failure ("$F_{1a}$") for Packet 1a in each of cycles 1 through $$N_{rec}^{1a} - 1$$

and decoding success ("$S_{1a}$") in cycle $$N_{rec}^{1a},$$

which is earlier than cycle $N_{est}$. The receiver then estimates and cancels the interference due to Packet 1a, attempts to recover Packet 2a, and encounters a decoding failure ("$F_{2a}$") for Packet 2a.

For Option 1, the transmitter uses all transmit power for Packet 2a after Packet 1a has been recovered. For each of cycles $$N_{rec}^{1a} + 1 \text{ to } N_{rec}^{2a},$$

the receiver attempts to recover Packet 2a based on all data symbol blocks received for Packet 2a, with the blocks received between cycles 1 through $$N_{rec}^{1a}$$

having the interference from Packet 1a removed and the blocks received between cycles $$N_{rec}^{1a} + 1 \text{ to } N_{rec}^{2a}$$

having higher transmit power. The receiver encounters decoding failure ("$F_{2a}$") for Packet 2a in each of cycles $$N_{rec}^{1a} + 1$$

through $$N_{rec}^{1a} - 1$$

and decoding success ("$S_{2a}$") in cycle $$N_{rec}^{2a}.$$

In this example, Packet 2a is also recovered early, i.e., before cycle $N_{est}$, because of the higher transmit power used for Packet 2a from cycle $$N_{rec}^{1a} + 1$$

onward. Two new data packets (Packets 1b and 2b) are then transmitted on Channels 1 and 2 starting in cycle $$N_{rec}^{2a} + 1.$$

The decoding process is repeated on these packets.

FIG. 6B shows IR transmission with short packet transmission for early termination (Option 2 in Table 1). In FIG. 6B, two new data blocks are transmitted for Packets 1a and 2a on Channels 1 and 2 in each of cycles 1 through $$N_{rec}^{1a}.$$

For each cycle, the receiver attempts to recover Packet 1a and does not attempt to recover Packet 2a. The receiver encounters decoding success ("$S_{1a}$") for Packet 1a in cycle $$N_{rec}^{1a}$$

(which is earlier than cycle $N_{est}$), estimates and cancels the interference due to Packet 1a, attempts to recover Packet 2a, and encounters a decoding failure ("$F_{2a}$") for Packet 2a. A new short Packet 1b with length $$N_{short}^{1b} \le (N_{est} - N_{rec}^{1a})$$

is then transmitted on Channel 1 starting in cycle $$N_{rec}^{1a} + 1.$$

For each of cycles $$N_{rec}^{1a} + 1 \text{ to } N_{rec}^{1a} + N_{rec}^{1b},$$

the receiver attempts to recover Packet 1b based on all data symbol blocks received for Packet 1b and encounters decoding success ("$S_{1b}$") in cycle $$N_{rec}^{1a} + N_{rec}^{1b}.$$

In this example, Packet 1b is also recovered before cycle $N_{est}$. However, no data is transmitted on Channel 1 after cycle $$N_{rec}^{1a} + N_{rec}^{1b},$$

for example, because the shortest length packet cannot be completely transmitted on Channel 1 prior to cycle $N_{est}$. The transmitter then uses all transmit power for Packet 2a after Packet 1b has been recovered.

For each of cycles $$N_{rec}^{1a} + N_{rec}^{1b} \text{ to } N_{rec}^{2a},$$

the receiver attempts to recover Packet 2a based on all data symbol blocks received for Packet 2a, with the blocks received between cycles 1 through $$N_{rec}^{1a}$$

having the interference from Packet 1a removed, the blocks received between cycles $$N_{rec}^{1a} + 1 \text{ to } N_{rec}^{1a} + N_{rec}^{1b}$$

having the interference from Packet 1b removed, and the blocks received after cycle $$N_{rec}^{1a} + N_{rec}^{1b}$$

having higher transmit power. The receiver encounters decoding success ("$S_{2a}$") for Packet 2a in cycle $$N_{rec}^{2a},$$

which in this example is before cycle $N_{est}$. Two new data packets are then transmitted on Channels 1 and 2 starting in cycle $$N_{rec}^{2a} + 1.$$

FIG. 6C shows IR transmission with long packet transmission for early termination (Option 3 in Table 1). In FIG. 6C, two new data blocks are transmitted for Packets 1a and 2a on Channels 1 and 2 in each of cycles 1 through $$N_{rec}^{1a}.$$

Upon encountering decoding success ("$S_{1a}$") for Packet 1a in cycle $$N_{rec}^{1a},$$

a new long Packet 1b with length $$N_{long}^{1b} > (N_{est} - N_{rec}^{1a})$$

is transmitted on Channel 1 starting in cycle $$N_{rec}^{1a} + 1.$$

For each of cycles $$N_{rec}^{1a} + 1 \text{ to } N_{rec}^{1a} + N_{rec}^{1b},$$

the receiver attempts to recover Packet 1*b* based on all data symbol blocks received for Packet 1*b* and encounters decoding success ("$S_{1b}$") in cycle $$N_{rec}^{1a} + N_{rec}^{1b},$$

which is after cycle $N_{est}$.

In cycle $$N_{rec}^{1a},$$

the receiver attempts to recover Packet 2*a* based on all data symbol blocks received for Packet 2*a*, with the interference from Packet 1*a* removed, and encounters decoding failure ("$F_{2a}$"). In cycle $$N_{rec}^{1a} + N_{rec}^{1b},$$

the receiver attempts to recover Packet 2*a* based on all data symbol blocks received for Packet 2*a*, with the blocks received between cycles 1 to $$N_{rec}^{1a}$$

having the interference from Packet 1*a* removed and the blocks received between cycles $$N_{rec}^{1a} + 1 \text{ to } N_{rec}^{1b}$$

having the interference from Packet 1*b* removed. The receiver encounters decoding success ("$S_{2a}$") for Packet 2*a* in cycle $$N_{rec}^{1a} + N_{rec}^{1b}.$$

Two new data packets are then transmitted on Channels 1 and 2 starting in cycle $$N_{rec}^{1a} + N_{rec}^{1b} + 1.$$

The transmission of a new long Packet 1*b* on Channel 1 may affect the actual rate and the PER achieved for Channel 2. As noted above, $N_{est}$ is the number of cycles predicted for recovering Packet 2*a* on Channel 2 with the interference from the packet(s) from Channel 1 canceled and for the target PER. If the long Packet 1*b* on Channel 1 is recovered in cycle $$N_{rec}^{1a} + N_{rec}^{1b},$$

which is later than cycle $N_{est}$, then (1) the rate achieved for Channel 2 decreases from $R_2(0, N_{est})$ to $$R_2(0, N_{rec}^1 + N_{rec}^1)$$

and (2) the PER for Packet 2*a* will be lower than the target PER because more redundancy has been transmitted for Packet 2*a*. Improved performance may be attained by terminating the transmission for Packet 2*a* after some predetermined number of cycles $$(N_{max}^{2a})$$

and using all transmit power for Packet 1*b*.

Figure 7:
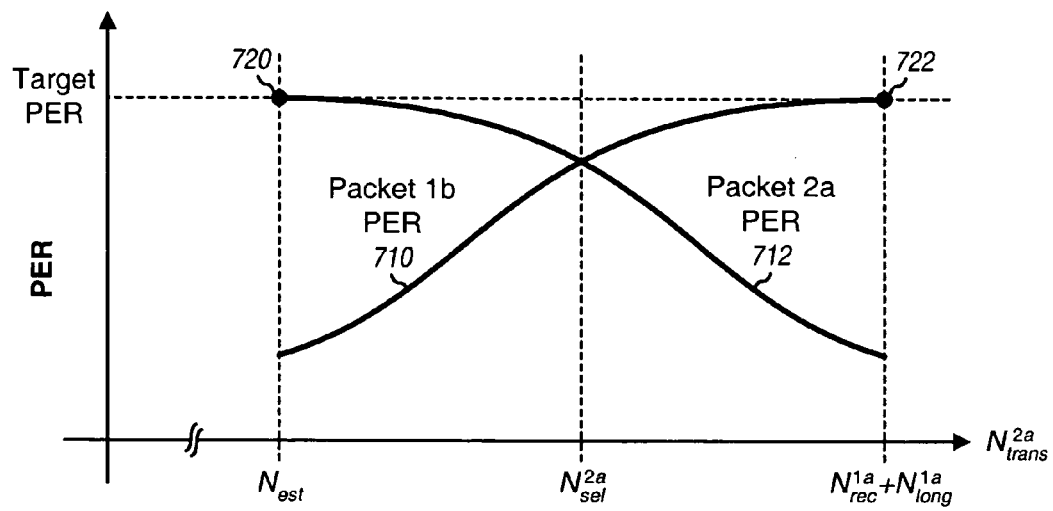

FIG. 7 shows a plot 710 of the PER for Packet 1*b* and a plot 712 of the PER for Packet 2*a* versus number of transmission cycles $$(N_{trans}^{2a})$$

for Packet 2*a*. The target PER is achieved for Packet 2*a* if it is transmitted for $N_{est}$ cycles $$(\text{i.e., } N_{trans}^{2a} = N_{est}),$$

as indicated by point 720. The PER for Packet 2*a* progressively decreases below the target PER the longer Packet 2*a* is transmitted past $N_{est}$ cycles, as shown by plot 712. The target PER is achieved for Packet 1*b* if it is transmitted for $$N_{long}^{1b}$$

cycles, which occurs at cycle $N_{rec}^{1a} + N_{long}^{1b}$, as indicated by point 722. This assumes that Packet 2a is transmitted during this entire time. The PER for Packet 1b progressively decreases below the target PER the earlier Packet 2a is terminated and all transmit power is used for Packet 1b, as shown by plot 710. The PERs for Packet 1b and 2a cross at cycle $N_{sel}^{2a}$.

If the transmission for Packet 2a is terminated at cycle $N_{sel}^{2a}$, then the same reliability can be achieved for both Packets 1b and 2a, and the likelihood of recovering Packet 1b before cycle $N_{rec}^{1a} + N_{long}^{1b}$ also improves.

Alternatively, instead of terminating the transmission of Packet 2a at cycle $N_{sel}^{2a}$, different transmit powers may be used for Packets 1b and 2a to achieve similar results. For example, $N_{long}^{1b}$ may be selected based on the use of more transmit power for Packet 1b and less transmit power for Packet 2a for the duration of Packet 1b (i.e., from cycles $N_{rec}^{1a} + 1$ to $N_{rec}^{1a} + N_{long}^{1b}$)

such that the PERs of Packets 1b and 2a are similar at cycle $N_{rec}^{1a} + N_{long}^{1b}$.

As another example, the transmit power for Packet 1b may be progressively increased and the transmit power for Packet 2a may be progressively decreased after cycle $N_{est}$. Different transmit powers may be used for different data streams using the third or fourth transmission scheme described above.

Table 2 shows some options available with the transmission of a long Packet 1b that may extend past cycle $N_{est}$.

TABLE 2

| Option | Description |
|---|---|
| A | If Packet 1b is recovered before Packet 2a, then any one of the options shown in Table 1 may be selected. |
| B | Terminate the transmission of Packet 2a after some predetermined number of cycles $N_{max}^{2a}$ (e.g., $N_{max}^{2a} = N_{sel}^{2a}$), wait for Packet 1b to be recovered, then attempt to recover Packet 2a with Packets 1a and 1b canceled. |

Figure 8:
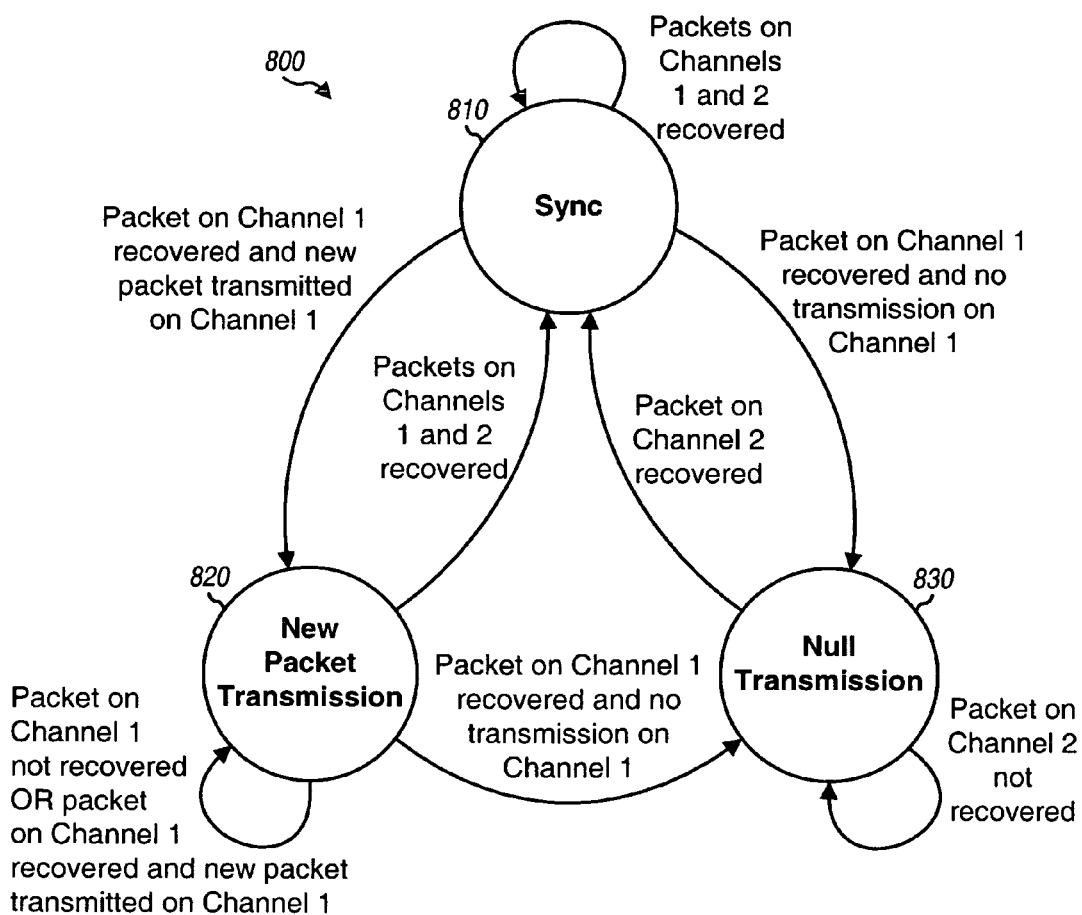
FIG. 8 shows a state diagram for the ordered SIC transmission scheme.

FIG. 8 shows an exemplary state diagram 800 that may be maintained by the transmitter and receiver for the ordered SIC transmission scheme. State diagram 800 includes a sync state 810, a new packet transmission state 820, and a null transmission state 830. In sync state 810, two new data packets (Packets 1a and 2a) are transmitted on Channels 1 and 2 starting in the same cycle. These two packets are expected to be recovered in $N_{est}$ cycles if the rate selection is reasonably accurate.

The state diagram transitions from sync state 810 to new packet transmission state 820 if Packet 1a on Channel 1 is recovered earlier than $N_{est}$ cycles and a new short or long data packet (Packet 1b) is transmitted on Channel 1. In state 820, the receiver attempts to recover Packet 1b on Channel 1 and does not attempt to recover Packet 2a on Channel 2 until Packet 1b is recovered and the interference from Packet 1b is canceled. The state diagram remains in state 820 if Packet 1b is not recovered or if Packet 1b is recovered and a new data packet (Packet 1c) is transmitted on Channel 1. The state diagram transitions from state 820 back to state 810 if the packets on both Channels 1 and 2 are recovered.

The state diagram transitions from sync state 810 to null transmission state 830 if Packet 1a on Channel 1 is recovered earlier than $N_{est}$ cycles and nothing is transmitted on Channel 1. The state diagram also transitions from state 820 to state 830 if the current packet on Channel 1 is recovered and nothing is transmitted on Channel 1. In state 830, the receiver attempts to recover Packet 2a on Channel 2 with the interference from all packets recovered on Channel 1 canceled. The state diagram remains in state 830 if Packet 2a on Channel 2 is not recovered and transitions back to state 810 if Packet 2a is recovered.

The ordered SIC transmission scheme can provide good performance if the rate selection is reasonably accurate, so that the recovery of a later data stream is not excessively delayed.

B. Cycled SIC Transmission Scheme

In a cycled SIC transmission scheme, the $N_D$ data streams are recovered by cycling through the data streams so that the data stream most likely to be decoded correctly is recovered first. Initially, $N_D$ rates are selected for the $N_D$ data streams, and $N_D$ data packets are transmitted on the $N_D$ parallel channels. The rate selection may be crude, and the packet sizes may be selected such that all data packets are expected to be recovered in $N_{est}$ cycles. Whenever a data packet is recovered for a data stream, a new packet is transmitted for that data stream and the receiver attempts to decode a data packet for the next data stream, as described below.

FIG. 9A shows IR transmission with the cycled SIC transmission scheme. In FIG. 9A, two new data blocks are transmitted starting in cycle 1 for Packets 1a and 2a on Channels

1 and 2. Packet 1*a* is designated to be recovered first and is processed based on a lower rate due to the interference from Packet 2*a*. Packet 2*a* is designated to be recovered later and is processed based on a higher rate achievable with the interference from Packet 1*a* canceled. Packets 1*a* and 2*a* have lengths of $N_{est}$ (i.e., are expected to be recovered in $N_{est}$ cycles). For each cycle, the receiver attempts to recover Packet 1*a* based on all data symbol blocks received for this packet and does not attempt to recover Packet 2*a* ("$X_{2a}$"). The receiver encounters decoding failure ("$F_{1a}$") for Packet 1*a* in each of cycles 1 through $$N_{rec}^{1a} - 1$$

and decoding success ("$S_{1a}$") in cycle $$N_{rec}^{1a}.$$

A new Packet 1*b* is then transmitted on Channel 1 starting in cycle $$N_{rec}^{1a} + 1.$$

Packet 1*b* has a length of $N_{est}$ and is processed based on a higher rate, which is estimated in cycle $N_{rec}^{1a}$ and under the assumption that the interference from Channel 2 will be canceled.

In cycle $$N_{rec}^{1a},$$

the receiver estimates and cancels the interference due to Packet 1*a*, attempts to recover Packet 2*a*, and encounters a decoding failure ("$F_{2a}$") for Packet 2*a*. For each of cycles $$N_{rec}^{1a} + 1 \text{ to } N_{rec}^{2a},$$

the receiver attempts to recover Packet 2*a* based on all data symbol blocks received for this packet, with the blocks received in cycles 1 through $$N_{rec}^{1a}$$

having the interference from Packet 1*a* removed and the blocks received in cycles $$N_{rec}^{1a} + 1$$

through $$N_{rec}^{2a}$$

having the interference from Packet 1*b*. The receiver encounters decoding failure ("$F_{2a}$") for Packet 2*a* in each of cycles $$N_{rec}^{1a} + 1$$

through $$N_{rec}^{2a} - 1$$

and decoding success ("$S_{2a}$") in cycle $$N_{rec}^{2a}.$$

A new Packet 2*b* is then transmitted on Channel 2 starting in cycle $$N_{rec}^{2a} + 1.$$

Packet 2*b* has a length of $N_{est}$ and is processed based on a higher rate, which is estimated in cycle $$N_{rec}^{2a}$$

and under the assumption that the interference from Channel 1 will be canceled.

In cycle $$N_{rec}^{2a},$$

the receiver estimates and cancels the interference due to Packet 2*a*, attempts to recover Packet 1*b*, and encounters a decoding failure ("$F_{1b}$") for Packet 1*b*. For each of cycles $$N_{rec}^{2a} + 1 \text{ to } N_{rec}^{1a} + N_{rec}^{1b},$$

the receiver attempts to recover Packet 1*b* based on all data symbol blocks received for this packet, with the blocks received in cycles $$N_{rec}^{1a} + 1$$

through $$N_{rec}^{2a}$$

having the interference from Packet 2a removed and the blocks received in cycles $$N_{rec}^{2a}+1$$

through $$N_{rec}^{1a}+N_{rec}^{1b}$$

having the interference from Packet 2b. The receiver encounters decoding success ("$S_{1b}$") for Packet 1b in cycle $$N_{rec}^{1a}+N_{rec}^{1b}.$$

The receiver attempts to recover subsequent packets on Channels 1 and 2 in similar manner.

FIG. 9B shows the order of recovering the data streams for the cycled SIC transmission scheme. The receiver attempts to recover Packet 1a on Channel 1 in cycles 1 through $$N_{rec}^{1a}.$$

Upon recovering Packet 1a in cycle $$N_{rec}^{1a},$$

the receiver attempts to recover Packet 2a on Channel 2 in cycles $$N_{rec}^{1a}+1 \text{ to } N_{rec}^{2a}.$$

Upon recovering Packet 2a in cycle $$N_{rec}^{2a},$$

the receiver attempts to recover Packet 1b on Channel 1 in cycles $$N_{rec}^{2a}+1 \text{ to } N_{rec}^{1a}+N_{rec}^{1b}.$$

The receiver attempts to recover subsequent packets on Channels 1 and 2 in similar manner.

In general, the receiver can attempt to recover the packets sent on the $N_D$ parallel channels based on the likelihood of recovering these packets. The likelihood of recovering the packet sent on each parallel channel is dependent on various factors such as (1) the post-processed SINR achieved for the parallel channel with linear detection and (2) the number of data symbol blocks already received for the parallel channel. In each cycle, the receiver can attempt to recover only the packet sent on the parallel channel most likely to be recovered in that cycle. Alternatively, the receiver can attempt to recover the packets on all $N_D$ parallel channels, one packet at a time, starting with the parallel channel most likely to be recovered and concluding with the parallel channel least likely to be recovered. If multiple parallel channels have the same likelihood of being recovered, then the receiver can select one parallel channel (e.g., at a time, in a random manner) for recovery.

The receiver can cycle through the $N_D$ parallel channels if (1) these channels achieve similar post-processed SINRs with linear detection and (2) the packets for these channels have the same length. As an example, consider a case in which $N_D=4$ and four new packets are transmitted on four parallel channels starting in cycle 1. In each cycle, the receiver may attempt to recover the packet sent on each parallel channel based on all data symbol blocks received for that packet. The receiver may be able to recover the packet transmitted on, e.g., Channel 2 first, and would then estimate and cancel the interference due to this packet. In each cycle thereafter, the receiver may attempt to recover the packet sent on each of Channels 1, 3, and 4 based on all data symbol blocks received for that packet. The receiver may be able to recover the packet transmitted on, e.g., Channel 3 next, and would then estimate and cancel the interference due to this packet. In each cycle thereafter, the receiver may attempt to recover the packet sent on each of Channels 1 and 4 based on all data symbol blocks received for that packet. The receiver may be able to recover the packet transmitted on, e.g., Channel 1 next, and would then estimate and cancel the interference due to this packet. In each cycle thereafter, the receiver may attempt to recover the packet sent on Channel 4 based on all data symbol blocks received for that packet. The receiver can thereafter simply cycle through the four parallel channels in a predetermined order, i.e., Channels 2, 3, 1, 4, then back to 2, and so on. This predetermined order is selected based on the order in which the packets are recovered for the four parallel channels. Whenever a data packet is recovered on the current parallel channel (the channel to attempt recovery first in the cycle), a new data packet is transmitted on that channel, and this packet is then recovered last.

The cycled SIC transmission scheme can provide good performance even with a crude rate selection. This is because IR transmission is effectively achieved for each data stream, as shown in FIGS. 9A and 9B. The cycled SIC transmission can provide good performance even if the channel conditions vary rapidly. Moreover, implementation of the cycled SIC transmission scheme is relatively simple since (1) the transmitter and receiver do not need to maintain state information for what is currently being transmitted and (2) the packet sizes do not need to be varied to fit within specific time windows, as is the case for the ordered SIC transmission scheme.

The ordered and cycled SIC transmission schemes are two exemplary schemes. Other transmission schemes may also be implemented for inter-dependent parallel channels. As an example, in a "hybrid" SIC transmission scheme, the receiver attempts to recover each of the data packets transmitted currently for the $N_D$ data streams based on all data symbol blocks received for that packet (i.e., the receiver does not skip the decoding of any packet). Each data symbol block for each packet would have (1) the interference from recovered packets canceled and (2) interference from packets not yet recovered. The SINR for each data packet may thus vary across the entire packet, depending on the extent of the interference cancellation, if any, for the packet. The hybrid SIC transmission scheme may also be used in combination with the ordered and cycled SIC transmission schemes. For example, the receiver may attempt to recover the data packet on Channel 2 in each cycle after the first data packet on Channel 1 has been received and canceled (e.g., for each cycle after cycle $N_{rec}^{1a}$ in FIGS. 6B and 6C).

3. Transmitter

Figure 10:
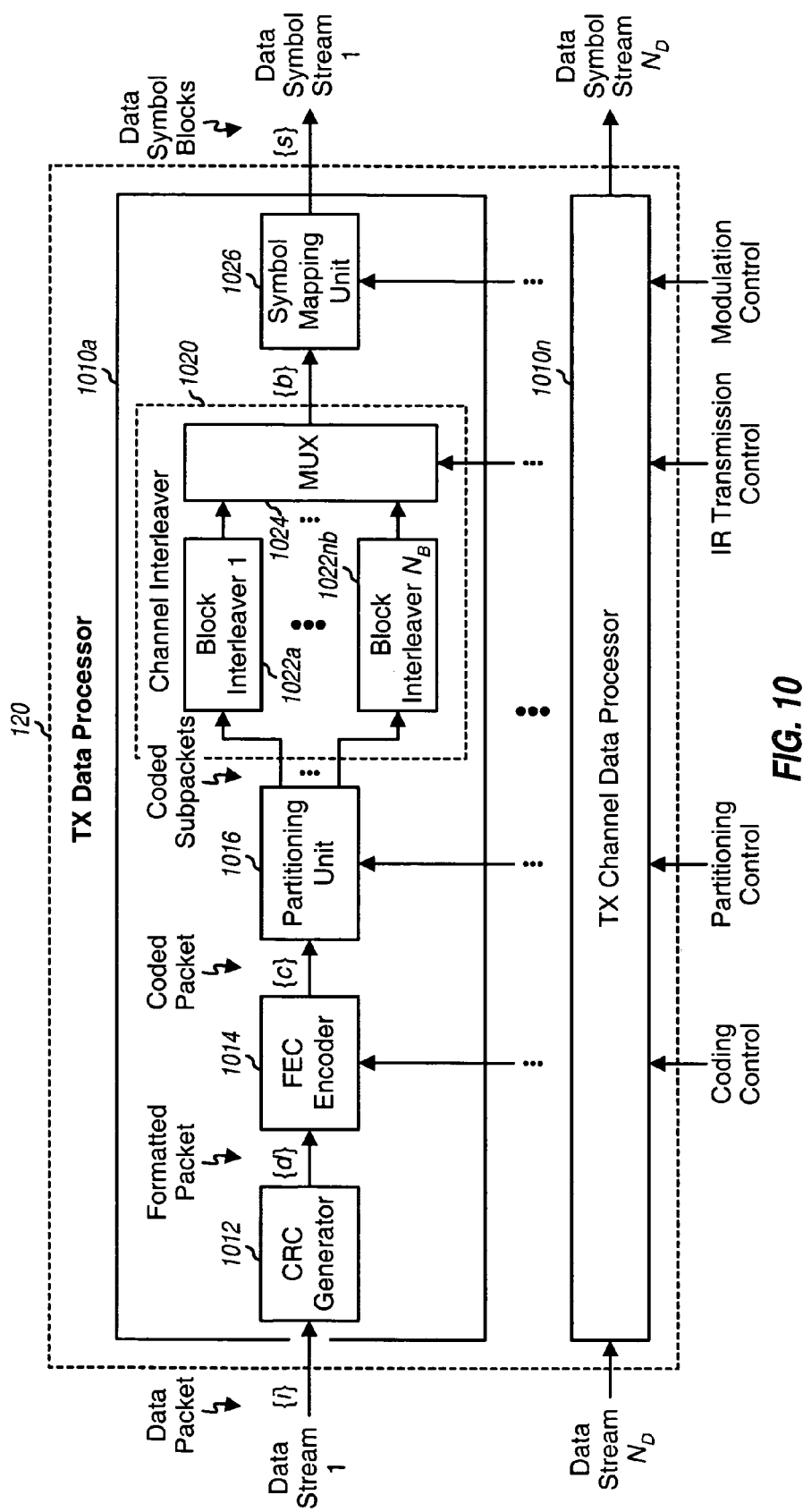
FIG. 10 shows a transmit (TX) data processor at the transmitter.
Figure 11:
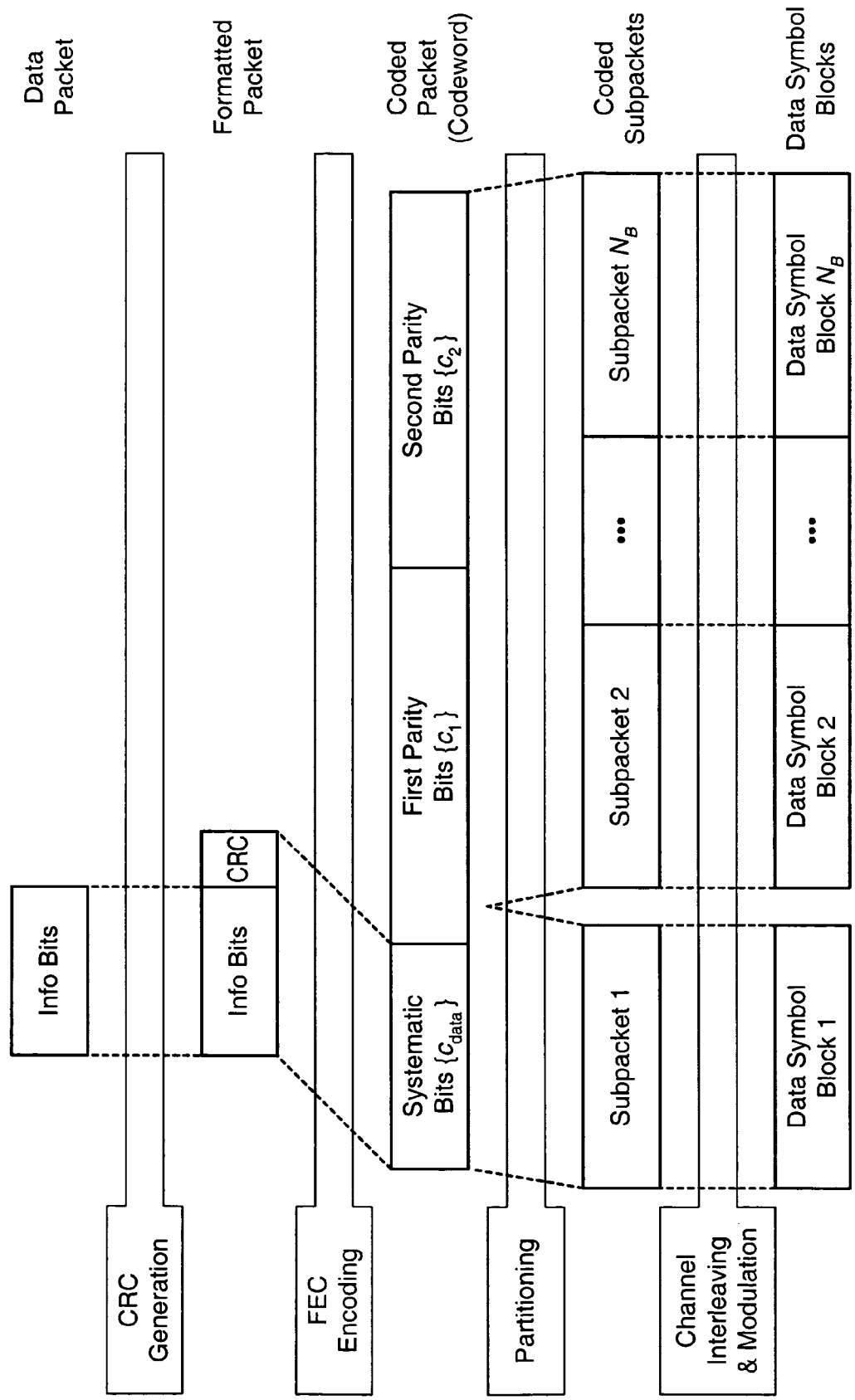
FIG. 11 illustrates the processing of one data packet by the transmitter.

FIG. 10 shows a block diagram of an embodiment of TX data processor 120 within transmitter 110. TX data processor 120 includes $N_D$ TX channel data processors 1010a through 1010n for $N_D$ data streams. Each TX channel data processor 1010 receives a respective data stream, processes each data packet in the data stream based on the rate selected for the stream, and provides a set of data symbol blocks for the packet. FIG. 11 illustrates the processing of one data packet by one data processor 1010.

Within each TX channel data processor 1010, a cyclic redundancy check (CRC) generator 1012 receives a data packet on the data stream being processed by data processor 1010, generates a CRC value for the data packet, and appends the CRC value to the end of the data packet to form a formatted packet. The CRC value is used by the receiver to check whether the packet is decoded correctly or in error. Other error detection codes may also be used instead of CRC. A forward error correction (FEC) encoder 1014 then encodes the formatted packet in accordance with a coding scheme or code rate indicated by the selected rate and provides a coded packet or "codeword". The encoding increases the reliability of the packet transmission. FEC encoder 1014 may implement a block code, a convolutional code, a Turbo code, some other code, or a combination thereof. In FIG. 11, the coded packet includes a first portion with systematic bits for the formatted packet, a second portion with parity bits from a first constituent encoder of a Turbo encoder, and a third portion with parity bits from a second constituent encoder of the Turbo encoder.

A partitioning unit 1016 receives and partitions the coded packet into $N_B$ coded subpackets, where $N_B$ may be dependent on the selected rate and indicated by a partitioning control from controller 180. The first coded subpacket typically contains all of the systematic bits and zero or more parity bits. This allows the receiver to recover the data packet with just the first coded subpacket under favorable channel conditions. The other $N_B-1$ coded subpackets contain the remaining parity bits, with each subpacket typically containing parity bits taken across the entire data packet.

A channel interleaver 1020 includes $N_B$ block interleavers 1022a through 1022nb that receive the $N_B$ coded subpackets from partitioning unit 1016. Each block interleaver 1022 interleaves (i.e., reorders) the code bits for its subpacket in accordance with an interleaving scheme and provides an interleaved subpacket. The interleaving provides time, frequency, and/or spatial diversity for the code bits. A multiplexer 1024 couples to all $N_B$ block interleavers 1022a through 1022nb and provides the $N_B$ interleaved subpackets, one at a time and if directed by an IR transmission control from controller 180. Multiplexer 1024 provides the interleaved subpacket from block interleaver 1022a first, then the interleaved subpacket from block interleaver 1022b next, and so on, and the interleaved subpacket from block interleaver 1022nb last. Multiplexer 1024 provides the next interleaved subpacket if a NAK is received for the data packet. All $N_B$ block interleavers 1022a through 1022nb can be purged whenever an ACK is received.

A symbol mapping unit 1026 receives the interleaved subpackets from channel interleaver 1020 and maps the interleaved data in each subpacket to modulation symbols. The symbol mapping is performed in accordance with a modulation scheme indicated by the selected rate. The symbol mapping may be achieved by (1) grouping sets of B bits to form B-bit binary values, where $B \geq 1$, and (2) mapping each B-bit binary value to a point in a signal constellation having $2^B$ points. This signal constellation corresponds to the selected modulation scheme, which may be BPSK, QPSK, $2^B$-PSK, $2^B$-QAM, and so on. As used herein, a "data symbol" is a modulation symbol for data, and a "pilot symbol" is a modulation symbol for pilot. Symbol mapping unit 1026 provides a block of data symbols for each coded subpacket, as shown in FIG. 11.

For each data packet, TX channel data processor 1010 provides $N_B$ data symbol blocks, which collectively include $N_{SYM}$ data symbols and can be denoted as $\{s\}=[s_1 s_2 \ldots s_{N_{SYM}}]$. Each data symbol $s_i$, where $i=1 \ldots N_{SYM}$, is obtained by mapping B code bits as follows: $s_i=\text{map}(b_i)$ where $b_i=[b_{i,1} b_{i,2} \ldots b_{i,B}]$.

Figure 12:
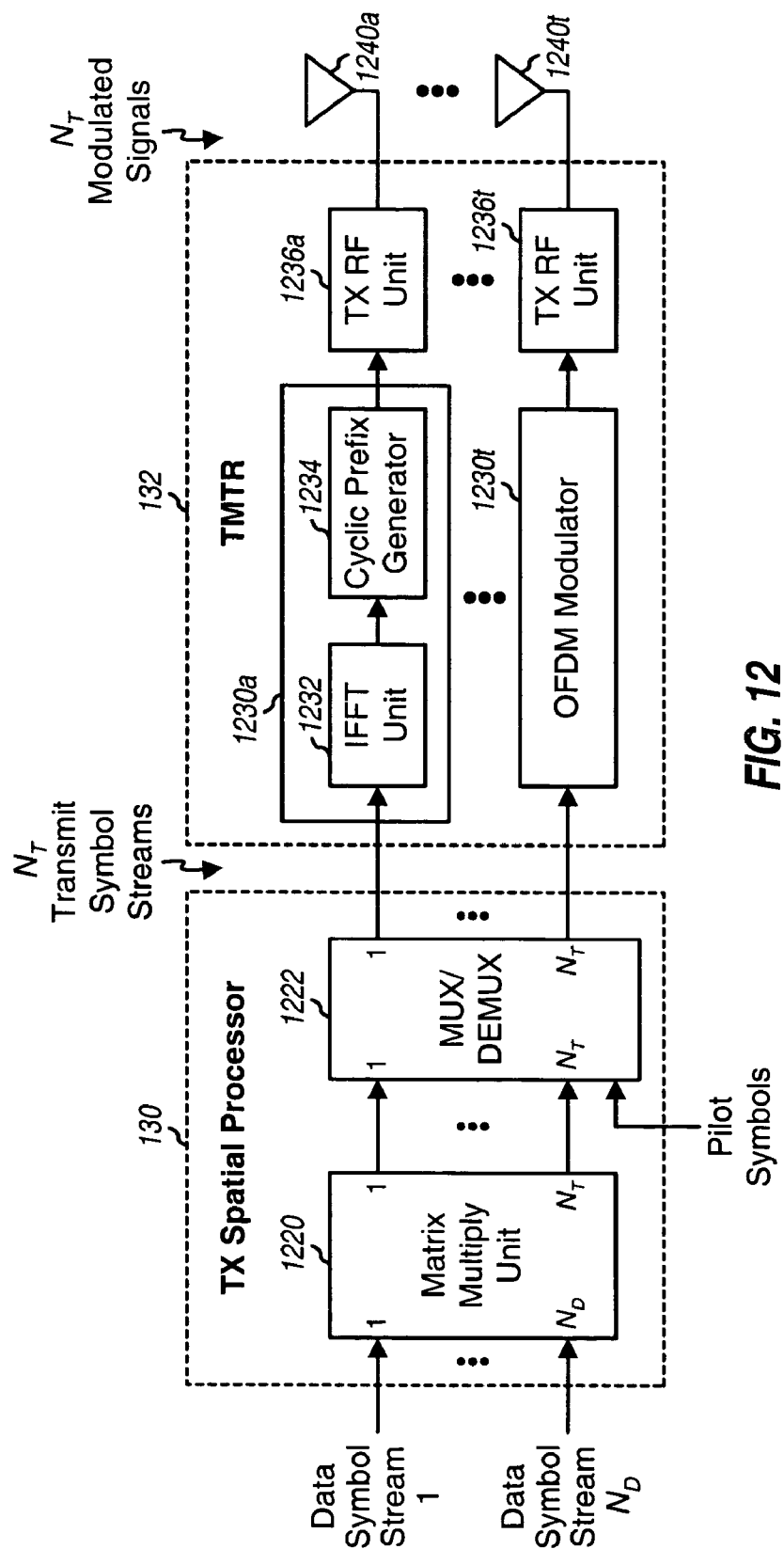
FIG. 12 shows a TX spatial processor and a transmitter unit at the transmitter.

FIG. 12 shows a block diagram of an embodiment of TX spatial processor 130 and transmitter unit 132. TX spatial processor 130 receives and processes $N_D$ data symbol streams from TX data processor 120 and provides $N_T$ transmit symbol streams to transmitter unit 132. The processing by TX spatial processor 130 is dependent on the particular transmission scheme selected for use.

Within TX spatial processor 130, a matrix multiplication unit 1220 receives up to $N_D$ data symbol blocks (represented by data vector s) for each slot. Unit 1220 performs matrix multiplication of the data vector s with (1) the unitary matrix V for the second transmission scheme and (2) the transmit basis matrix M for the third transmission scheme. Unit 1220 simply passes the data vector s through for the other transmission schemes. A multiplexer/demultiplexer (MUX/DEMUX) 1222 receives the symbols from unit 1220 and provides these symbols to the proper transmit antennas and subbands (if OFDM is used). Multiplexer/demultiplexer 1222 also multiplexes in pilot symbols (e.g., in a time division multiplex (TDM) manner) and provides $N_T$ transmit symbol sequences for the $N_T$ transmit antennas in each slot. Each transmit symbol sequence is designated for transmission from one transmit antenna in one slot.

Transmitter unit 132 includes $N_T$ OFDM modulators 1230a through 1230t and $N_T$ TX RF units 1236a through 1236t for the $N_T$ transmit antennas. For a single-carrier MIMO system, OFDM modulators 1230 are not needed, and TX spatial processor 130 provides the $N_T$ transmit symbol sequences directly to TX RF units 1236a through 1236t. For a MIMO-OFDM system, TX spatial processor 130 provides the $N_T$ transmit symbol sequences to OFDM modulators 1230a through 1230t. Each OFDM modulator 1230 includes an inverse fast Fourier transform (IFFT) unit 1232 and a cyclic prefix generator 1234. Each OFDM modulator 1230 receives a respective transmit symbol sequence from TX spatial processor 130 and groups each set of $N_F$ transmit symbols and zero signal values for the $N_F$ subbands. (Subbands not used for data transmission are filled with zeros.) IFFT unit 1232 transforms each set of $N_F$ transmit symbols and zeros to the time domain using an $N_F$-point inverse fast Fourier transform and provides a corresponding transformed symbol that contains $N_F$ chips. Cyclic prefix generator 1234 repeats a portion of each transformed symbol to obtain a corresponding OFDM symbol that contains $N_F+N_{cp}$ chips. The repeated portion is referred to as a cyclic prefix, and $N_{cp}$ is the number of chips being repeated. The cyclic prefix ensures that the OFDM symbol retains its orthogonal properties in the presence of multipath delay spread caused by frequency selective fading (i.e., a frequency response that is not flat). Cyclic prefix generator 1234 provides a sequence of OFDM symbols for the sequence of transmit symbols.

TX RF units 1236a through 1236t receive and condition $N_T$ OFDM/transmit symbol sequences to generate $N_T$ modulated signals, which are transmitted from $N_T$ transmit antennas 1240a through 1240t, respectively.

4. Receiver

Figure 13:
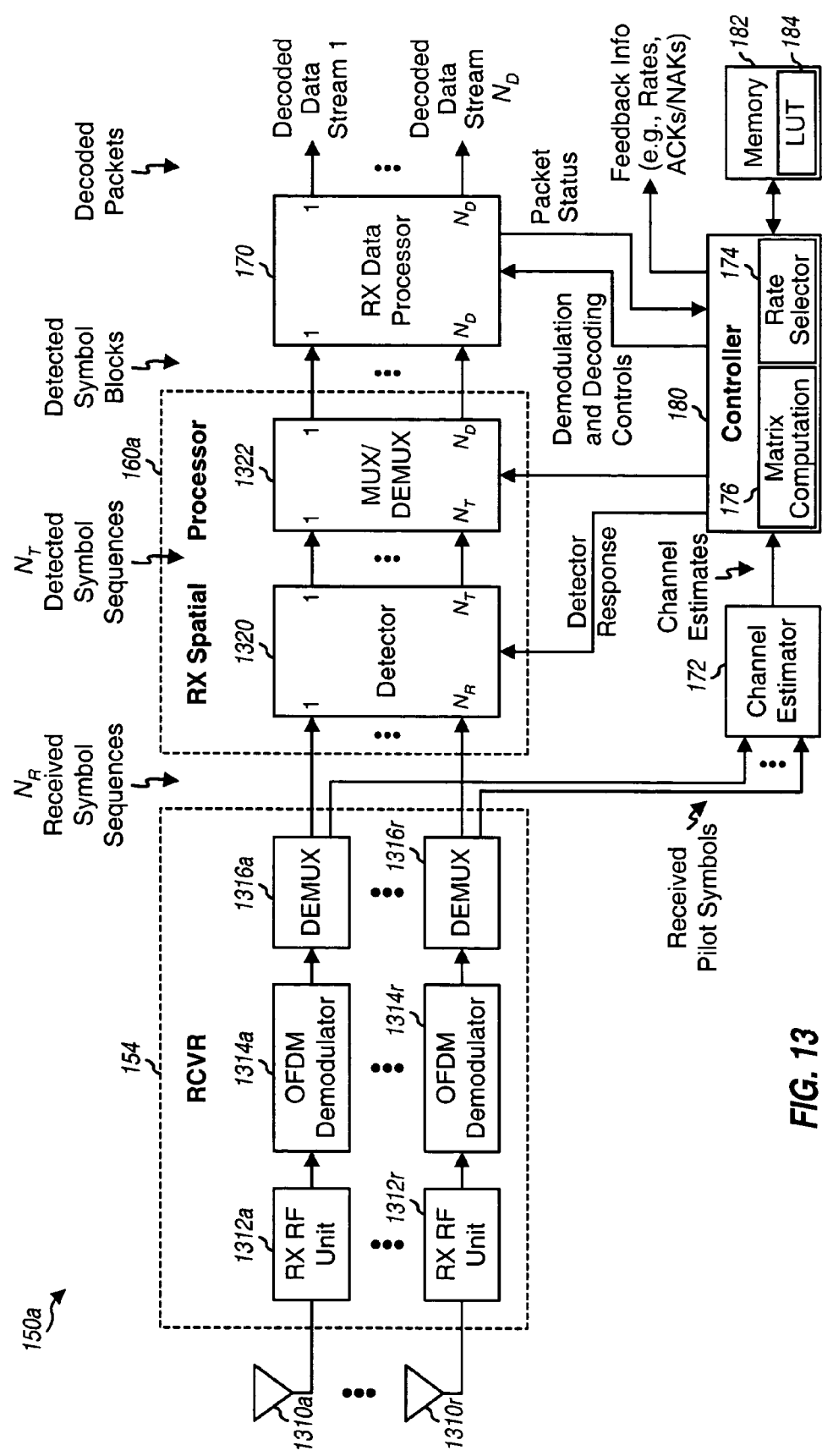
FIG. 13 shows one embodiment of the receiver.

FIG. 13 shows a block diagram of a receiver 150a, which is one embodiment of receiver 150 in FIG. 1. At receiver 150a, $N_R$ receive antennas 1310a through 1310r receive the $N_T$ modulated signals transmitted by transmitter 110 and provide $N_R$ received signals to $N_R$ RX RF units 1312a through 1312r, respectively, within receiver unit 154. Each RX RF unit 1312 conditions and digitizes its received signal and provides a stream of symbols/chips. For a single-carrier MIMO system, OFDM demodulators 1314a through 1314r are not needed, and each RX RF unit 1312 provides a stream of symbols directly to a respective demultiplexer 1316. For a MIMO-OFDM system, each RX RF unit 1312 provides a stream of chips to a respective OFDM demodulator 1314. Each OFDM demodulator 1314 performs OFDM demodulation on its stream of chips by (1) removing the cyclic prefix in each received OFDM symbol to obtain a received transformed symbol and (2) transforming each received transformed symbol to the frequency domain with a fast Fourier transform (FFT) to obtain $N_F$ received symbols for the $N_F$ subbands. For both systems, demultiplexers 1316a through 1316r receive $N_R$ symbol streams from RX RF units 1312 or OFDM demodulators 1314, provide $N_R$ sequences of received symbols (for data) for each slot to RX spatial processor 160a, and provide received pilot symbols to channel estimator 172.

RX spatial processor 160a includes a detector 1320 and a multiplexer/demultiplexer 1322. Detector 1320 performs spatial or space-time processing (or "detection") on the $N_R$ received symbol sequences to obtain $N_T$ detected symbol sequences for each slot. Each detected symbol is an estimate of a data symbol transmitted by the transmitter. Detector 1320 may implement an MRC detector shown in equation (2), an MMSE detector shown in equation (3), a linear zero-forcing detector shown in equation (4), an MMSE linear equalizer, a decision feedback equalizer, or some other detector/equalizer. The detection may be performed based on an estimate of the channel response matrix H or the effective channel response matrix $H_{eff}=HM$, depending on whether or not the data symbols are pre-multiplied with the transmit basis matrix M at the transmitter. For a MIMO-OFDM system, the receiver performs detection separately for each of the subbands used for data transmission.

For each slot, detector 1320 provides $N_T$ detected symbol sequences that correspond to the $N_T$ entries of ŝ. Multiplexer/demultiplexer 1322 receives the $N_T$ detected symbol sequences and provides the detected symbols to $N_D$ detected symbol blocks for the $N_D$ data streams. Each detected symbol block is an estimate of a data symbol block transmitted by the transmitter.

Channel estimator 172 estimates the channel response matrix H for the MIMO channel and the noise floor at the receiver (e.g., based on received pilot symbols) and provides channel estimates to controller 180. Within controller 180, a matrix computation unit 176 derives the detector response W (which may be $W_{mrc}$, $W_{mmse}$, $W_{zf}$, or $\Sigma^{-1}U^H$) based on the estimated channel response matrix, as described above, and provides the detector response to detector 1320. Detector 1320 pre-multiplies the vector r of received symbols with the detector response W to obtain the vector ŝ of detected symbols. Rate selector 174 (which is implemented by controller 180 for the embodiment shown in FIG. 13) performs rate selection based on the channel estimates. A look-up table (LUT) 184 stores a set of rates supported by the MIMO system and a set of parameter values for each rate (e.g., the data rate, packet size, coding scheme or code rate, modulation scheme, and so on for each rate). Rate selector 174 accesses LUT 184 for information used for rate selection.

Figure 14:
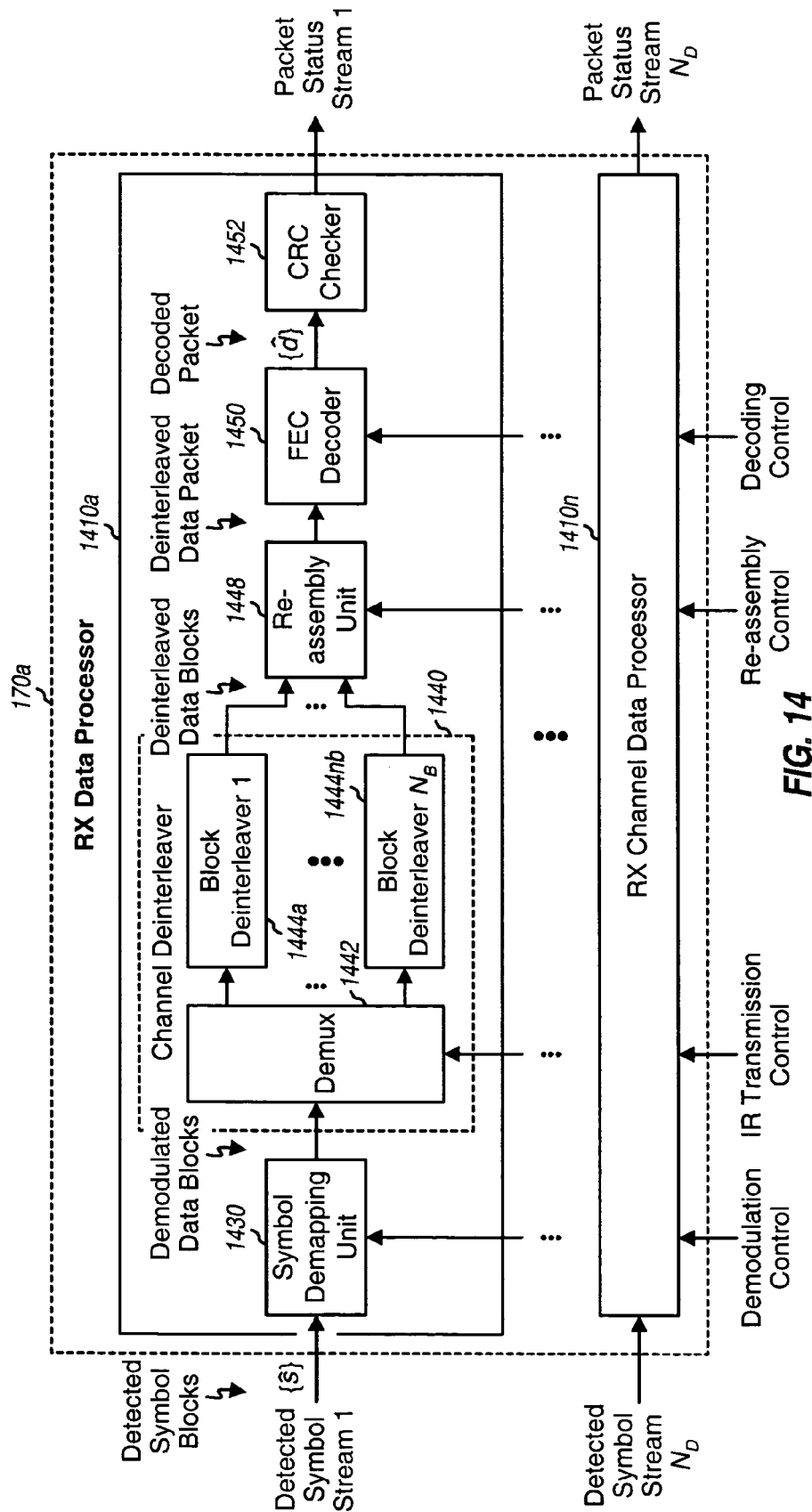
FIG. 14 shows a receive (RX) data processor at the receiver in FIG. 13.

FIG. 14 shows a block diagram of an RX data processor 170a, which is one embodiment of RX data processor 170 in FIGS. 1 and 13. RX data processor 170a includes $N_D$ RX channel data processors 1410a through 1410n for $N_D$ data streams. Each RX channel data processor 1410 receives and processes a respective detected symbol stream and provides a decoded data stream.

Within each RX channel data processor 1410, a symbol demapping unit 1430 receives detected symbol blocks from RX spatial processor 160a, one block at a time. For each detected symbol block, symbol demapping unit 1430 demodulates the detected symbols in accordance with the modulation scheme used for that block (as indicated by a demodulation control from controller 180) and provides a demodulated data block to a channel deinterleaver 1440. Channel deinterleaver 1440 includes a demultiplexer 1442 and $N_B$ block deinterleavers 1444a through 1444nb. Prior to receiving a new data packet, block deinterleavers 1444a through 1444nb are initialized with erasures. An erasure is a value that substitutes for a missing code bit (i.e., one not yet received) and is given appropriate weight in the decoding process. Multiplexer 1442 receives demodulated data blocks from symbol demapping unit 1430 and provides each demodulated data block to the proper block deinterleaver 1444. Each block deinterleaver 1444 deinterleaves the demodulated data in its block in a manner complementary to the interleaving performed at the transmitter for that block.

For independent parallel channels, whenever a new data symbol block is received from the transmitter for a data packet on a parallel channel, the decoding can be performed anew on all blocks received for that packet. A re-assembly unit 1448 forms a packet of deinterleaved data for subsequent decoding. The deinterleaved data packet contains (1) deinterleaved data blocks for all data symbol blocks received for the current packet to be decoded and (2) erasures for data symbol blocks not received for the current packet. Re-assembly unit 1448 performs re-assembly in a complementary manner to the partitioning performed by the transmitter, as indicated by a re-assembly control from controller 180. An FEC decoder 1450 decodes the deinterleaved data packet in a manner complementary to the FEC encoding performed at the transmitter, as indicated by a decoding control from controller 180. For example, a Turbo decoder or a Viterbi decoder may be used for FEC decoder 1450 if Turbo or convolutional coding, respectively, is performed at the transmitter. FEC decoder 1450 provides a decoded packet for the current packet. A CRC checker 1452 checks the decoded packet to determine whether the packet is decoded correctly or in error and provides the status of the decoded packet.

Figure 15:
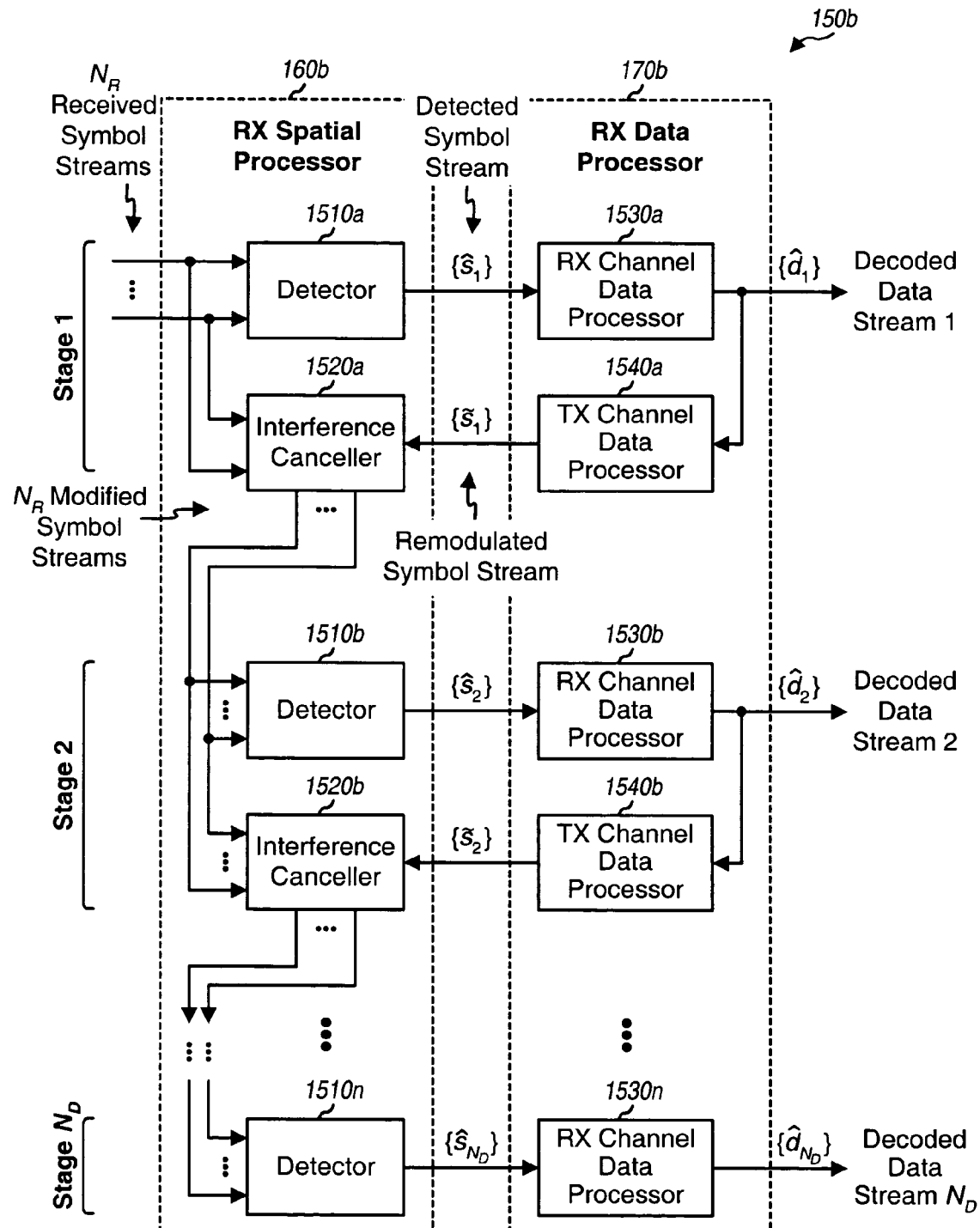
FIG. 15 shows a receiver that implements the SIC technique.

FIG. 15 shows a block diagram of a receiver 150b, which implements the SIC technique and is another embodiment of receiver 150 in FIG. 1. Receiver 150b includes an RX spatial processor 160b and an RX data processor 170b that collectively implement $N_D$ successive (i.e., cascaded) receiver processing stages. Each of stages 1 to $N_D-1$ includes a detector 1510, an interference canceller 1520, an RX channel data processor 1530, and a TX channel data processor 1540. The last stage $N_D$ includes only a detector 1510n and an RX channel data processor 1530n.

For stage 1, detector 1510a performs detection on the $N_R$ received symbol sequences for each slot and provides a detected symbol block for a data packet (Packet x) in the data stream being recovered by stage 1. RX channel data processor 1530a demodulates, deinterleaves, and decodes all detected symbol blocks received for Packet x. If Packet x is decoded correctly, then TX channel data processor 1540a encodes, interleaves, and modulates Packet x to obtain a remodulated symbol sequence, which is an estimate of the data symbol sequence for Packet x. TX channel data processor 1540a performs the same processing as that performed by the transmitter for Packet x. Interference canceller 1520a receives and spatially processes the remodulated symbol sequence in the same manner performed by transmitter 110 for Packet x to obtain $N_T$ transmit symbol sequences, which contain only the symbol components for Packet x. Interference canceller 1520a further processes the transmit symbol sequences with the channel response matrix to obtain interference components due to Packet x. The interference components are then subtracted from the $N_R$ received symbol sequences to obtain $N_R$ modified symbol sequences, which are provided to stage 2.

Each of stages 2 through $N_D-1$ performs the same processing as stage 1, albeit on the $N_R$ modified symbol sequences from the preceding stage instead of the $N_R$ received symbol sequences. Stage $N_D$ performs detection and decoding on the $N_R$ modified symbol sequences from stage $N_D-1$ and does not perform interference estimation and cancellation.

Detectors 1510a through 1510n may each implement an MRC detector, an MMSE detector, a linear zero-forcing detector, an MMSE linear equalizer, a decision feedback equalizer, or some other detector/equalizer. Each RX channel data processor 1530 may be implemented as shown in FIG. 14, and each TX channel data processor 1540 may be implemented as shown in FIG. 10. As described above, the receiver may attempt to recover the data packet for a later stage only after the data packets for earlier stages have been recovered. Buffers (not shown in FIG. 15) would then store the symbols from each stage until they are ready for processing by later stages.

For both single-carrier MIMO and MIMO-OFDM systems, the receiver and/or transmitter can estimate the received SINRs or the post-processed SINRs (depending on whether or not SIC is used) for the $N_D$ parallel channels and select a suitable rate for data transmission on each parallel channel. The rate selection may be performed in various manners. In one rate selection scheme, the rate for each parallel channel is selected based on the SINR needed by an equivalent system with an AWGN channel (i.e., with a flat frequency response) to support the average spectral efficiency computed for the parallel channel. This rate selection scheme is described in detail in commonly assigned U.S. patent application Ser. No. 10/176,567, entitled "Rate Control for Multi-Channel Communication Systems," filed Jun. 20, 2002. In another rate selection scheme, the rate for each parallel channel is selected based on an operating SINR computed for the parallel channel based on an average post-processed SINR for the parallel channel and an SINR offset. The highest rate with a required SINR (in an AWGN channel) that is less than or equal to the operating SINR is selected for the parallel channel. This rate selection scheme is described in detail in commonly assigned U.S. patent application Ser. No. 10/394,529, entitled "Transmission Mode Selection for Data Transmission in a Multi-Channel Communication System," filed Mar. 20, 2003.

The IR transmission techniques described herein may be implemented in a frequency division duplex (FDD) system and a time division duplex (TDD) system. For an FDD system, the forward MIMO channel and the feedback channel use different frequency bands and are likely to observe different channel conditions. In this case, the receiver can estimate the $N_D$ parallel channels, select the rates for the parallel channels, and send back the selected rates, as shown in FIGS. 1 through 3. For a TDD system, the forward MIMO channel and the feedback channel share the same frequency band and are likely to observe similar channel conditions. In this case, the transmitter can estimate the $N_D$ parallel channels based on a pilot sent by the receiver and selects the rates for the parallel channels. The channel estimation and rate selection may thus be performed by the receiver, the transmitter, or both.

The IR transmission techniques described herein may be implemented by various means. For example, these techniques may be implemented in hardware, software, or a combination thereof. For a hardware implementation, the processing units used at the transmitter for IR transmission may be implemented within one or more application specific integrated circuits (ASICs), digital signal processors (DSPs), digital signal processing devices (DSPDs), programmable logic devices (PLDs), field programmable gate arrays (FPGAs), processors, controllers, micro-controllers, microprocessors, other electronic units designed to perform the functions described herein, or a combination thereof. The processing units used at the receiver for receiving an IR transmission may also be implemented within one or more ASICs, DSPs, DSPDs, PLDs, FPGAs, processors, controllers, and so on.

For a software implementation, the IR transmission techniques may be implemented with modules (e.g., procedures, functions, and so on) that perform the functions described herein. The software codes may be stored in a memory unit (e.g., memory units 142 and 182 in FIG. 1) and executed by a processor (e.g., controllers 140 and 180). The memory unit may be implemented within the processor or external to the processor, in which case it can be communicatively coupled to the processor via various means as is known in the art.

Headings are included herein for reference and to aid in locating certain sections. These headings are not intended to limit the scope of the concepts described therein under, and these concepts may have applicability in other sections throughout the entire specification.

The previous description of the disclosed embodiments is provided to enable any person skilled in the art to make or use the present invention. Various modifications to these embodiments will be readily apparent to those skilled in the art, and the generic principles defined herein may be applied to other embodiments without departing from the spirit or scope of the invention. Thus, the present invention is not intended to be limited to the embodiments shown herein but is to be accorded the widest scope consistent with the principles and novel features disclosed herein.

What is claimed is:

1. A method of performing incremental redundancy (IR) transmission in a wireless multiple-input multiple-output (MIMO) communication system comprising:
processing a first data packet to obtain a first plurality of symbol blocks;
processing a second data packet to obtain a second plurality of symbol blocks;

transmitting the first plurality of symbol blocks, one symbol block at a time, on a first parallel channel to a receiver;

transmitting the second plurality of symbol blocks, one symbol block at a time, on a second parallel channel to the receiver;

terminating transmission of the first plurality of symbol blocks early if the first data packet is recovered by the receiver with fewer than all of the first plurality of symbol blocks; and terminating transmission of the second plurality of symbol blocks early if the second data packet is recovered by the receiver with fewer than all of the second plurality of symbol blocks.

2. The method of claim 1, further comprising:

processing a third data packet to obtain a third plurality of symbol blocks;

transmitting the third plurality of symbol blocks, one symbol block at a time, on a third parallel channel to the receiver; and terminating transmission of the third plurality of symbol blocks early if the third data packet is recovered by the receiver with fewer than all of the third plurality of symbol blocks.

3. The method of claim 1, further comprising:

receiving an indication that the first data packet has been recovered;

estimating throughput for the first and, second parallel channels with no transmission on the first parallel channel until the second data packet is recovered;

estimating throughput for the first and second parallel channels with transmission of a new data packet on the first parallel channel after the first data packet; and transmitting the new data packet on the first parallel channel if the throughput with transmission on the first parallel channel is greater than the throughput with no transmission on the first parallel channel.

4. The method of claim 1, further comprising:

receiving an indication that the first data packet has been recovered; and transmitting no data packets on the first parallel channel until the second data packet is recovered.

5. The method of claim 4, wherein symbol blocks for the second data packet are transmitted at full transmit power after terminating transmission of the first plurality of symbol blocks for the first data packet.

6. The method of claim 1, further comprising:

receiving an indication that the first data packet has been recovered;

processing a third data packet to obtain a set of at least one symbol block for the third data packet; and transmitting the set of at least one symbol block, one symbol block at a time, on the first parallel channel.

7. The method of claim 6, wherein the third data packet is expected to be recovered by the receiver at or before a time instant when the second data packet is expected to be recovered.

8. The method of claim 6, wherein the third data packet is expected to be recovered by the receiver after a time instant when the second data packet is expected to be recovered.

9. The method of claim 8, further comprising:

terminating transmission of the second plurality of symbol blocks after a predetermined number of symbol blocks.

10. The method of claim 6, further comprising:

increasing transmit power for the third packet and reducing transmit power for the second packet at or after a time instant when the second data packet is expected to be recovered.

11. The method of claim 1, further comprising:

receiving an indication that the first data packet has been recovered;

processing a third data packet to obtain a third plurality of symbol blocks for the third data packet;

transmitting the third plurality of symbol blocks, one symbol block at a time, on the first parallel channel after the first data packet;

receiving an indication that the second data packet has been recovered;

processing a fourth data packet to obtain a fourth plurality of symbol blocks; and transmitting the fourth plurality of symbol blocks, one symbol block at a time, on the second parallel channel after the second data packet.

12. The method of claim 1, further comprising:

receiving a first rate for the first parallel channel and a second rate for the second parallel channel, and wherein the first and second data packets are processed in accordance with the first and second rates, respectively.

13. The method of claim 12, wherein the processing the first data packet includes encoding the first data packet in accordance with a coding scheme indicated by the first rate to obtain a coded packet, partitioning the coded packet into a plurality of coded subpackets, and modulating the plurality of coded subpackets in accordance with a modulation scheme indicated by the first rate to obtain the first plurality of symbol blocks.

14. The method of claim 1, wherein one symbol block in the first plurality of symbol blocks includes all systematic bits for the first data packet and is transmitted first for the first data packet.

15. The method of claim 1, further comprising:

receiving at least one symbol block, selected from among the first and second pluralities of symbol blocks, for transmission in one time slot on the first and second parallel channels; and spatially processing the at least one symbol block with a transmit basis matrix to obtain a plurality of transmit symbol sequences for a plurality of transmit antennas.

16. The method of claim 1, wherein the first and second parallel channels are formed so as to achieve similar signal-to-noise-and-interference ratios (SINRs) after linear detection at the receiver.

17. The method of claim 1, wherein the first and second parallel channels correspond to first and second transmit antennas at a transmitter in the MIMO system.

18. The method of claim 1, wherein the first and second parallel channels correspond to first and second spatial channels in the MIMO system.

19. The method of claim 1, wherein the MIMO system implements orthogonal frequency division multiplexing (OFDM), and wherein each of the first and second parallel channels is formed with a plurality of subbands and a plurality of transmit antennas.

20. The method of claim 19, wherein a plurality of parallel channels are formed by diagonally cycling through the plurality of subbands of the plurality of transmit antennas, the plurality of parallel channels including the first and second parallel channel.

21. The method of claim 1, wherein the MIMO system implements orthogonal frequency division multiple access (OFDMA), and wherein each packet is transmitted on a set of subbands available for data transmission.

22. The method of claim 1, wherein a plurality of data packets are processed and transmitted simultaneously on a plurality of parallel channels, wherein transmission of symbol blocks for each data packet is terminated early if the data packet is recovered by the receiver with fewer than all symbol blocks generated for the data packet, and wherein total transmit power is distributed among data packets not yet terminated.

23. A transmitter operative to perform incremental redundancy (IR) transmission in a wireless multiple-input multiple-output (MIMO) communication system, comprising:
    a data processor operative to process a first data packet to obtain a first plurality of symbol blocks and process a second data packet to obtain a second plurality of symbol blocks; and
    a controller operative to
        initiate transmission of the first plurality of symbol blocks, one symbol block at a time, on a first parallel channel to a receiver,
        initiate transmission of the second plurality of symbol blocks, one symbol block at a time, on a second parallel channel to the receiver,
        terminate transmission of the first plurality of symbol blocks early if the first data packet is recovered by the receiver with fewer than all of the first plurality of symbol blocks, and
        terminate transmission of the second plurality of symbol blocks early if the second data packet is recovered by the receiver with fewer than all of the second plurality of symbol blocks.

24. The transmitter of claim 23, wherein the controller is further operative to
    receive an indication that the first data packet has been recovered;
    estimate throughput for the first and second parallel channels with no transmission on the first parallel channel until the second data packet is recovered;
    estimate throughput for the first and second parallel channels with transmission of a new data packet on the first parallel channel after the first data packet; and
    initiate transmission of the new data packet on the first parallel channel if the throughput with transmission on the first parallel channel is greater than the throughput with no transmission on the first parallel channel.

25. The transmitter of claim 23, wherein the data processor is further operative to process a third data packet to obtain a third plurality of symbol blocks, and wherein the controller is further operative to initiate transmission of the third plurality of symbol blocks, one symbol block at a time, on the first parallel channel upon receiving an indication that the first data packet has been recovered.

26. The transmitter of claim 23, wherein the data processor is operative to
    encode the first data packet in accordance with a coding scheme indicated by a rate selected for the first parallel channel to obtain a coded packet,
    partition the coded packet into a plurality of coded subpackets, and
    modulate the plurality of coded subpackets in accordance with a modulation scheme indicated by the rate to obtain the first plurality of symbol blocks.

27. The transmitter of claim 23, further comprising:
    a spatial processor operative to receive at least one symbol block, selected from among the first and second pluralities of symbol blocks, for transmission in one time slot on the first and second parallel channels and to spatially process the least symbol block with transmit basis matrix to obtain a plurality of transmit symbol sequences for a plurality of transmit antennas.

28. An apparatus operative to perform incremental redundancy (IR) transmission in a wireless multiple-input multiple-output (MIMO) communication system, comprising:
    means for processing a first data packet to obtain a first plurality of symbol blocks;
    means for processing a second data packet to obtain a second plurality of symbol blocks;
    means for transmitting the first plurality of symbol blocks, one symbol block at a time, on a first parallel channel to a receiver;
    means for transmitting the second plurality of symbol blocks, one symbol block at a time, on a second parallel channel to the receiver;
    means for terminating transmission of the first plurality of symbol blocks early if the first data packet is recovered by the receiver with fewer than all of the first plurality of symbol blocks; and
    means for terminating transmission of the second plurality of symbol blocks early if the second data packet is recovered by the receiver with fewer than all of the second plurality of symbol blocks.

29. The apparatus of claim 28, further comprising:
    means for processing a third data packet to obtain a set of at least one symbol block for the third data packet; and
    means for transmitting the set of at least one symbol block, one symbol block at a time, on the first parallel channel upon receiving an indication that the first data packet has been recovered.

30. The apparatus of claim 28, further comprising:
    means for processing a third data packet to obtain a third plurality of symbol blocks for the third data packet;
    means for transmitting the third plurality of symbol blocks, one symbol block at a time, on the first parallel channel upon receiving an indication that the first data packet has been recovered;
    means for processing a fourth data packet to obtain a fourth plurality of symbol blocks; and
    means for transmitting the fourth plurality of symbol blocks, one symbol block at a time, on the second parallel channel upon receiving an indication that the second data packet has been recovered.

31. A method of receiving an incremental redundancy (IR) transmission on first and second parallel channels in a wireless multiple-input multiple-output (MIMO) communication system, comprising:
    receiving a symbol block for a first data packet transmitted via the first parallel channel, wherein a first plurality of symbol blocks are generated for the first data packet and transmitted one symbol block at a time on the first parallel channel;
    decoding all symbol blocks received for the first data packet to obtain a first decoded packet;
    determining whether the first data packet is recovered based on the first decoded packet;
    terminating the receiving, decoding, and determining for the first data packet if the first data packet is recovered or if all of the first plurality of symbol blocks have been received;

receiving a symbol block for a second data packet transmitted via the second parallel channel, wherein a second plurality of symbol blocks are generated for the second data packet and transmitted one symbol block at a time on the second parallel channel;

decoding all symbol blocks received for the second data packet to obtain a second decoded packet;

determining whether the second data packet is recovered based on the second decoded packet; and terminating the receiving, decoding, and determining for the second data packet if the second decoded packet is recovered or if all of the second plurality of symbol blocks have been received.

32. The method of claim 31, wherein decoding, determining, and terminating for the first data packet are performed whenever a symbol block is received for the first data packet, and wherein the decoding, determining, and terminating for the second data packet are performed whenever a symbol block is received fin the second data packet.

33. The method of claim 31, further comprising:
performing detection on a plurality of received symbol sequences for a plurality of receive antennas to obtain the symbol block for the first data packet and the symbol block for the second data packet.

34. The method of claim 33, wherein the detection is performed based on a minimum mean square error (MMSE) detector, a maximal ratio combining (MRC) detector, or a linear zero-forcing (ZE) detector.

35. The method of claim 31, wherein the receiving, decoding, determining, and terminating for the first data packet are performed independently of the receiving, decoding, determining, and terminating for the second data packet.

36. The method of claim 31, wherein the first data packet is designated to be recovered before the second data packet, and wherein the decoding, determining, and terminating for the second data packet are not performed until the first data packet is recovered.

37. The method of claim 31, further comprising:
if the first data packet is recovered,
estimating interference due to the first data packet on the second data packet, and
canceling the interference due to the first data packet from symbol blocks received for the second data packet, and wherein all symbol blocks received for the second data packet, with the interference from the first data packet canceled, are decoded to obtain the second decoded packet.

38. The method of claim 31, wherein the first data packet is recovered before the second data packet and a new data packet is not transmitted on the first parallel channel until the second data packet is recovered.

39. The method of claim 37, further comprising:
if the first data packet is recovered,
receiving a symbol block for a third data packet transmuted via the first parallel channel, wherein a set of at least one symbol block is generated for the third data packet and transmitted one symbol block at a time on the first parallel channel after the first data packet,
decoding all symbol blocks received for the third data packet to obtain a third decoded packet,
determining whether the third data packet is recovered based on the third decoded packet, and
terminating the receiving, decoding, and determining for the third data packet if the third data packet is recovered or if all of the set of at least one symbol block has been received.

40. The method of claim 39, further comprising:
if the third data packet is recovered,
estimating interference due to the third data packet on the second data packet, and
canceling the interference due to the third data packet from the symbol blocks received for the second data packet, and wherein all symbol blocks received for the second data packet, with the interference from the first and third data packets canceled, are decoded to obtain the second decoded packet.

41. The method of claim 39, wherein the third data packet is expected to be recovered at or before a time instant when the second data packet is expected to be recovered.

42. The method of claim 39, wherein the third data packet is expected to be recovered after a time instant when the second data packet is expected to be recovered.

43. The method of claim 37, further comprising:
if the first data packet is recovered,
receiving a symbol block for a third data packet transmitted via the first parallel channel, wherein a third plurality of symbol blocks are generated for the third data packet and transmitted one symbol block at a time on the first parallel channel after the first data packet,
decoding all symbol blocks received for the third data packet to obtain a third decoded packet,
determining whether the third data packet is recovered based on the third decoded packet, and
terminating the receiving, decoding, and determining for the third data packet if the third data packet is recovered or if all of the third plurality of symbol blocks has been received; and
if the second decoded packet is recovered,
estimating interference due to the second data packet on the third data packet, and
canceling the interference due to the second data packet from the symbol blocks received for the third data packet, and wherein all symbol blocks received for the third data packet, with the interference from the second data packet canceled, are decoded to obtain the third decoded packet.

44. The method of claim 31, further comprising:
obtaining signal-to-noise-and-interference ratio (SINR) estimates for the first and second parallel channels; and
selecting a first rate for the first parallel channel and a second rate for the second parallel channel based on the SINR estimates, and wherein the first and second data packets are decoded in accordance with the first and second rates, respectively.

45. The method of claim 31, further comprising:
sending an acknowledgment (ACK) if the first data packet is recovered or a negative acknowledgment (NAK) if the first data packet is not recovered.

46. A method of receiving an incremental redundancy (IR) transmission on a plurality of parallel channels in a wireless multiple-input multiple-output (MIMO) communication system, comprising:
obtaining a plurality of symbol blocks for a plurality of data packets transmitted on the plurality of parallel channels in a current period, one symbol block for each data packet and one data packet for each parallel channel, wherein multiples symbol blocks are generated for each data packet and transmitted one symbol block at a time on an associated parallel channel;
selecting one of the plurality of parallel channels for recovery;

decoding all symbol blocks obtained for a data packet transmitted on the selected parallel channel to obtain a decoded packet;

determining whether the data packet transmitted on the selected parallel channel is recovered based on the decoded packet;

terminating the obtaining, decoding, and determining for the data packet transmitted on the selected parallel channel, if the data packet is recovered or if all of the multiple symbol blocks have been obtained for the data packet; and estimating and canceling interference due to the data packet transmitted on the selected parallel channel, if the data packet is recovered.

47. The method of claim 46, wherein a parallel channel with a highest likelihood of being recovered, among the plurality of parallel channels, is selected for recovery.

48. The method of claim 46, wherein a parallel channel that is last recovered furthest away in time from the current period, among the plurality of parallel channels, is selected for recovery.

49. The method of claim 46, wherein a parallel channel with a highest number of data symbol blocks in the current period, among the plurality of parallel channels, is selected for recovery.

50. The method of claim 46, wherein the selecting, decoding, determining, terminating, and estimating and canceling are performed for each of the plurality of parallel channels in the current period.

51. The method of claim 46, wherein the selecting, decoding, determining, terminating, and estimating and canceling are performed for the plurality of parallel channels, one parallel channel at a time and in a cycled order, the cycled order being defined such that one or more parallels most recently recovered are placed last and are recovered last subsequently.

52. The method of claim 46, wherein the selecting, decoding, determining, terminating, and estimating and canceling are performed for the plurality of parallel channels, one parallel channel at a time and in a predetermined order, in the current period.

53. The method of claim 52, wherein the predetermined order is selected based on likelihood of recovering the data packet on each of the plurality of parallel channels.

54. The method of claim 52, wherein the predetermined order is selected based on an order in which data packets previously transmitted on the plurality of parallel channels are recovered.

55. The method of claim 46, wherein the plurality of parallel channels have similar signal-to-noise-and-interference ratios (SINRs) after linear detection at a receiver.

56. The method of claim 46, wherein the plurality of parallel channels are formed by transmitting diagonally across a plurality of subbands of a plurality of transmit antennas.

57. A receiver operative to receive an incremental redundancy (IR) transmission on first and second parallel channels in a wireless multiple-input multiple-output (MIMO) communication system, comprising:

a data processor operative to
receive a symbol block for a first data packet via the first parallel channel, wherein a first plurality of symbol blocks are generated for the first data packet and transmitted one symbol block at a time on the first parallel channel,
decode all symbol blocks received for the first data packet to obtain a first decoded packet,
determine whether the first data packet is recovered based on the first decoded packet,
receive a symbol block for a second data packet via the second parallel channel, wherein a second plurality of symbol blocks are generated for the second data packet and transmitted one symbol block at a time on the second parallel channel,
decode all symbol blocks received for the second data packet to obtain a second decoded packet, and
determine whether the second data packet is recovered based on the second decoded packet; and
a controller operative to
terminate processing by the data processor for the first data packet if the first data packet is recovered or if all of the first plurality of symbol blocks have been received, and
terminate processing by the data processor for the second data packet if the second decoded packet is recovered or if all of the second plurality of symbol blocks have been received.

58. The receiver of claim 57, further comprising:
a spatial processor operative to receive a plurality of symbol sequences for a plurality of receive antennas and perform detection on the plurality of received symbol sequences to obtain the symbol block for the first data packet and the symbol block for the second data packet.

59. The receiver of claim 58, wherein the spatial processor is operative to, if the first data packet is recovered, estimate interference due to the first data packet on the second data packet and cancel the interference due to the first data packet from symbol blocks received for the second data packet, and wherein the data processor is operative to decode all symbol blocks received for the second data packet, with the interference from the first data packet canceled, to obtain the second decoded packet.

60. The receiver of claim 57, further comprising:
a channel estimator operative to obtain signal-to-noise-and-interference ratio (SINR) estimates for the first and second parallel channels; and
a rate selector operative to select a first rate for the first parallel channel and a second rate for the second parallel channel based on the SINR estimates, and
wherein the data processor is operative to decode the first and second data packets in accordance with the first and second rates, respectively.

61. An apparatus for receiving an incremental redundancy (IR) transmission on first and second parallel channels in a wireless multiple-input multiple-output (MIMO) communication system, comprising:

means for receiving a symbol block for a first data packet via the first parallel channel, wherein a first plurality of symbol blocks are generated for the first data packet and transmitted one symbol block at a time on the first parallel channel;
means for decoding all symbol blocks received for the first data packet to obtain a first decoded packet;
means for determining whether the first data packet is recovered based on the first decoded packet;
means for terminating the receiving, decoding, and determining for the first data packet if the first data packet is recovered or if all of the first plurality of symbol blocks have been received;
means for receiving a symbol block for a second data packet via the second parallel channel, wherein a second plurality of symbol blocks are generated for the second data packet and transmitted one symbol block at a time on the second parallel channel;
means for decoding all symbol blocks received for the second data packet to obtain a second decoded packet;

means for determining whether the second data packet is recovered based on the second decoded packet; and means for terminating the receiving, decoding, and determining for the second data packet if the second decoded packet is recovered or if all of the second plurality of symbol blocks have been received.

62. The apparatus of claim 61, further comprising:

means for receiving a plurality of symbol sequences for a plurality of receive antennas; and means for performing detection on the plurality of received symbol sequences to obtain the symbol block for the first data packet and the symbol block for the second data packet.

63. The apparatus of claim 61, further comprising:

means for estimating interference due to the first data packet on the second data packet, if the first data packet is recovered; and means for canceling the interference due to the first data packet from symbol blocks received for the second data packet, and wherein all symbol blocks received for the second data packet, with the interference from the first data packet canceled, are decoded to obtain the second decoded packet.

* * * * *